(12) United States Patent
Weagle

(10) Patent No.: US 7,128,329 B2
(45) Date of Patent: Oct. 31, 2006

(54) VEHICLE SUSPENSION SYSTEMS

(76) Inventor: David Weagle, 11 Boldt Farms Rd., Edgartown, MA (US) 02539

(*) Notice: Subject to any disclaimer, the term of this patent is extended or adjusted under 35 U.S.C. 154(b) by 3 days.

(21) Appl. No.: 10/949,264

(22) Filed: Sep. 24, 2004

(65) Prior Publication Data
US 2005/0067806 A1    Mar. 31, 2005

Related U.S. Application Data

(63) Continuation-in-part of application No. 10/669,412, filed on Sep. 25, 2003, now Pat. No. 7,048,292.

(51) Int. Cl.
*B62K 25/00* (2006.01)
(52) U.S. Cl. .................................... 280/284
(58) Field of Classification Search ........ 280/283–286, 280/275
See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,217,241 A | 6/1993 | Girvin | |
| 5,244,224 A | 9/1993 | Busby | |
| 5,306,036 A | 4/1994 | Busby | |
| 5,409,249 A | 4/1995 | Busby | |
| 5,441,292 A | 8/1995 | Busby | |
| 5,474,318 A | 12/1995 | Castellano | |
| 5,509,679 A | 4/1996 | Leitner | |
| 5,553,881 A | 9/1996 | Klassen et al. | |
| 5,628,524 A | 5/1997 | Klassen et al. | |
| 5,671,936 A | 9/1997 | Turner | |
| 5,678,837 A | 10/1997 | Leitner | |
| 5,791,674 A | 8/1998 | D'Aluisio et al. | |
| 5,899,480 A | 5/1999 | Leitner | |
| 6,199,886 B1 | 3/2001 | Guenther | |
| 6,203,042 B1 | 3/2001 | Wilcox | |
| 6,206,397 B1 | 3/2001 | Klassen et al. | |
| 6,378,885 B1 | 4/2002 | Ellsworth et al. | |
| 2005/0057018 A1 | 3/2005 | Saiki | |

*Primary Examiner*—Lesley D. Morris
*Assistant Examiner*—L. Lum
(74) *Attorney, Agent, or Firm*—Stahl Law Firm

(57) ABSTRACT

A wheel suspension system having under powered acceleration a squat response that begins in the realm of anti squat and passes through a point of lessened anti squat at a further point in the travel.

9 Claims, 19 Drawing Sheets

VEHICLE SUSPENSION SYSTEMS

This application is a continuation in part of U.S. application Ser. No. 10/669,412, filed Sep. 25, 2003 now U.S. Pat. No. 7,048,292, which is incorporated herein by reference in its entirety.

BACKGROUND

This invention relates to suspension systems capable of reducing or eliminating a squat response.

Automobiles, bicycles, motorcycles, all terrain vehicles, and other wheel driven vehicles are used for various purposes, including transportation and leisure. These vehicles are designed to use a power source to drive through a power transmission system to a wheel or wheels, which transfers rotary motion to the ground via tractive force between a wheel or wheels and the ground. Vehicles are also used to traverse even terrain like paved streets, and uneven terrain like off-road dirt trails. Off road trails are generally bumpier and allow for less wheel traction than paved roads. A bumpier terrain is best navigated with a vehicle that has a suspension system. A suspension system in a vehicle is aimed to provide a smoother ride for an operator or rider, and increase wheel traction over varied terrain. Vehicle suspension systems for the front wheel and for the back wheel are available.

One undesirable effect of suspension systems is the loss of energy in the way of suspension compression or extension during powered acceleration. Such energy loss is particularly notable in vehicles that are driven by low energy power sources, for example, bicycles and solar vehicles. For example, the average rider of a bicycle can exert only a limited amount of power or energy for a short period of time and an even lesser amount for an extended period of time. Therefore, even a very small power loss can have a significant effect on rider performance and comfort. Suspension travel is the distance a suspended wheel travels when the suspension is moved from a fully extended state to a fully compressed state. In bicycles, suspension travel has been increased for many designs and with these increases in suspension travel; the aforementioned energy loss has become even more apparent to riders. But even for a vehicle with a high power energy source, any loss in energy reduces the vehicle's efficiency, for example its fuel efficiency. Where vehicles are used in a manner that requires frequent accelerations, including positive and negative accelerations, the efficiency of the vehicle is particularly affected by any loss of energy resulting from the vehicles geometry, including the geometry and design of its suspension systems.

Thus, by minimizing energy loss resulting from the design of a vehicle's suspension system, the efficiency of the vehicle is improved and thereby its environmental impact. The need for a suspension system that can better preserve a vehicles efficiency and energy has therefore become more pressing. The present invention provides suspension system designs for vehicles that reduce these energy losses.

SUMMARY OF THE INVENTION

Figure 1A:
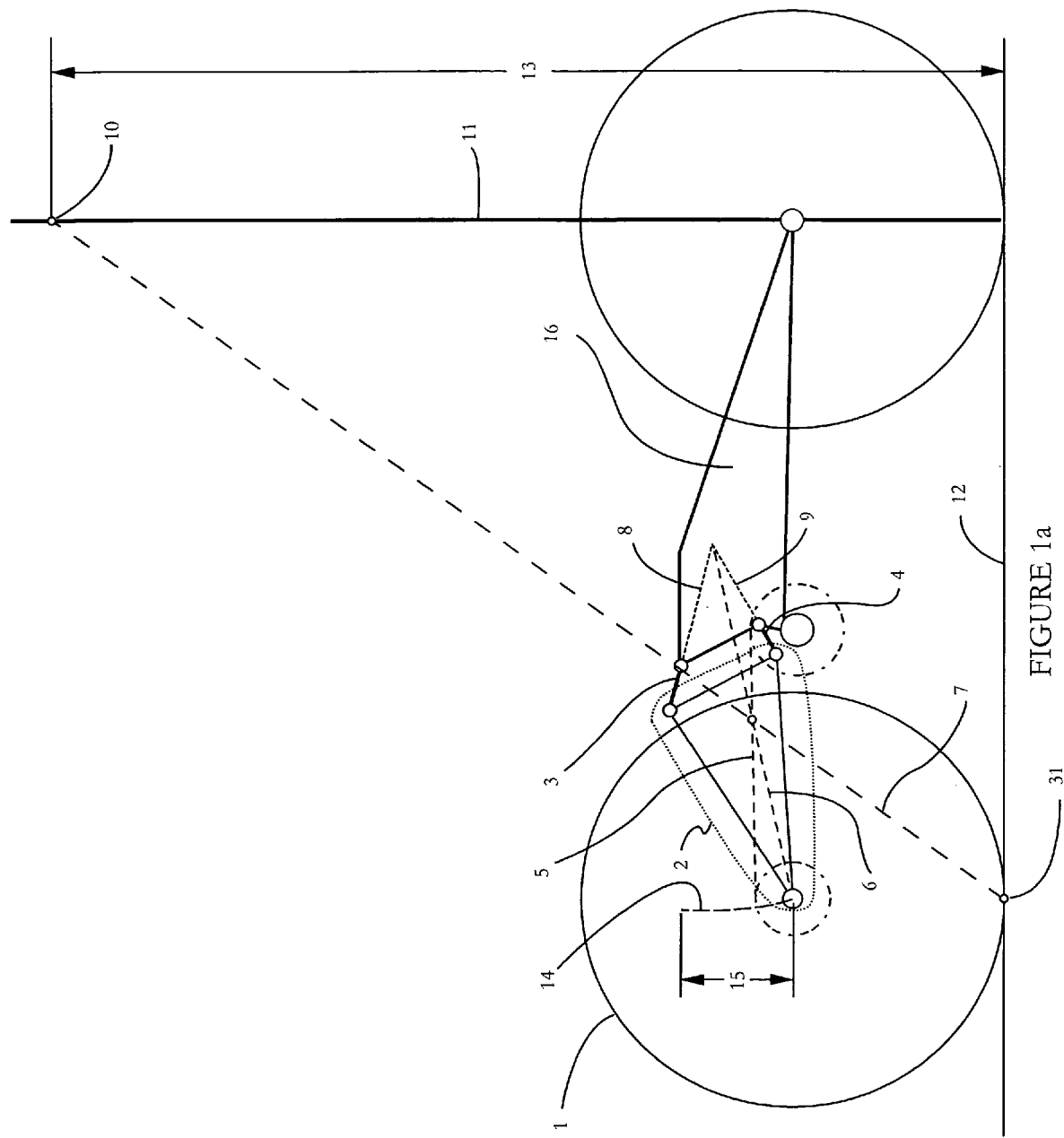
FIG. 1a is a side view of a chain driven vehicle using a driven wheel suspension system that achieves a squat curve according to certain embodiments of the current invention. The vehicle is shown with the driven wheel suspension system in an uncompressed state.

The current invention relates to new suspension systems for vehicles, for example, bicycles, motorcycles, cars, SUVs, trucks, two wheel vehicles, four wheel vehicles, front wheel suspension vehicles, driven wheel suspension vehicles, and any other kind of vehicle with a suspension system. In certain embodiments of the invention, a suspension system of the invention is capable of facilitating a squat response that lowers the energy loss resulting from squat. In certain preferred embodiments, a suspension system of the invention is capable of lowering energy loss resulting from squat by producing an anti-squat response. An anti-squat response of a suspension system of the invention, in certain embodiments, varies along suspension travel of the vehicle and preferably is higher at the beginning of suspension travel and less thereafter.

Certain embodiments of the invention comprise a wheel suspension design that uses a tuned squat response to reduce powered acceleration induced suspension movement at tactical points during the driven wheel suspension travel. A vehicle designed to use the preferred embodiment of the invention can accelerate under power with a lower amount of energy loss and a more stable vehicle chassis than known systems.

Suspension systems of the invention are useful for a variety of vehicles and preferably in human powered vehicles. The average rider of a bicycle or other human powered vehicle can exert only a limited amount of power or energy for a short period of time and an even lesser amount for an extended period of time. Therefore, even a very small power loss can have a significant detrimental effect on rider performance and comfort. The need for a suspension system that can better preserve the rider's energy has therefore become more pressing. The present invention provides suspension system designs for vehicles that reduce energy loss during powered acceleration.

In certain embodiments of the invention, a wheel suspension system comprises a wheel connected to a wheel carrier unit and said wheel carrier unit connected to spring damper means; and isolating said wheel from a frame structure with the wheel suspension system having an squat curve with said squat curve having a decreasing rate of squat as the suspension system moves from a beginning point in the wheel travel to an ending point in the wheel travel.

In certain embodiments of the invention, a compressible wheel suspension system comprises a wheel connected to a wheel carrier unit and said wheel carrier unit connected to spring damper means; and isolating said wheel from a frame structure with the wheel suspension system having a squat curve with said squat curve having a decreasing squat amount and without said squat amount increasing as the suspension system moves from a beginning point in the wheel travel towards an ending point in the wheel travel increase.

In certain embodiments of the invention, a compressible vehicle suspension system comprises a defined squat curve, with said squat curve having a maximum value at the lowest amount of suspension compression, and a minimum value at a further point in the travel, and a continuously decreasing amount of squat throughout the wheel travel.

In certain embodiments of the invention, a vehicle suspension system comprises a defined squat curve, with said squat curve having a slope that is generally negative at an earlier point in the suspension travel, and a slope that is less negative at a interim point in the suspension travel, and a slope that is then more negative at a latter point in the suspension travel.

In certain embodiments of the invention, a compressible wheel suspension system comprises a wheel connected to a wheel carrier unit and said wheel carrier unit connected to a top link and a bottom link, with a top link connected to spring damper means; With said top and bottom links rotating together in a clockwise direction, and said top and bottom links connecting said wheel carrier to a frame structure, isolating said wheel from the frame structure. Said top link and said bottom link having projected link force lines and said top link projected force line intersecting said lower link projected force line at a point in the beginning of the suspension travel and said top link projected force line intersecting said lower link at a point later in the travel.

In certain embodiments of the invention, a compressible wheel suspension system comprises a wheel connected to a wheel carrier unit and said wheel carrier unit connected to a top link and a bottom link, with said wheel carrier connected to spring damper means; with said top and bottom links rotating together in a clockwise direction, and said top and bottom links connecting said wheel carrier to a frame structure, isolating said wheel from the frame structure. Said top link and said bottom link having projected link force lines and said top link projected force line intersecting said lower link projected force line at a point in the beginning of the suspension travel and said top link projected force line intersecting said lower link at a point later in the travel.

In certain embodiments of the invention, a compressible wheel suspension system comprises a wheel connected to a wheel carrier unit and said wheel carrier unit connected to a top link and a bottom link, with said bottom link connected to spring damper means; with said top and bottom links rotating together in a clockwise direction, and said top and bottom links connecting said wheel carrier to a frame structure, isolating said wheel from the frame structure, said top link and said bottom link having projected link force lines and said top link projected force line intersecting said lower link projected force line at a point in the beginning of the suspension travel and said top link projected force line intersecting said lower link at a point later in the travel.

In certain embodiments of the invention, a compressible wheel suspension system comprises a wheel connected to a wheel carrier unit and said wheel carrier unit connected to a top link and a bottom link, with said top and bottom links connected to spring damper means; with said top and bottom links rotating together in a clockwise direction, and said top and bottom links connecting said wheel carrier to a frame structure, isolating said wheel from the frame structure. Said top link and said bottom link having projected link force lines and said top link projected force line intersecting said lower link projected force line at a point in the beginning of the suspension travel and said top link projected force line intersecting said lower link at a point later in the travel.

In practice, precisely controlling squat in a suspension system can allow for very little suspension movement during powered acceleration with favorable bump compliance. The further a vehicle suspension is compressed, the higher the spring force at the wheel rotational axis. Most powered acceleration happens within the first 40 percent of the suspension travel. Because spring force is lowest in the beginning of a suspension travel, a suspension is more susceptible to manipulation due to squat forces at that time. If enough anti squat force is not present to inhibit mass transfer in the beginning of the suspension travel, the suspension will compress, and when it rebounds, energy will be lost through the damper. The low spring force in the beginning of the suspension travel allows for higher levels of movement than at later points in the suspension travel. Minimizing suspension movement due to mass transfer during powered acceleration reduces the amount of damper movement that occurs at that time. With lower amounts of damper movement comes a lower amount of energy that the damper must dissipate, and therefore more of the acceleration force provided by a power source can be used to accelerate the vehicle. The amount of energy consumed to produce enough anti-squat force to reduce movement earlier in the suspension travel is less than the amount of energy that would be lost in the damper during suspension movement. As a driven wheel suspension system is compressed through its travel, spring force increases, and therefore driven wheel resistance to movement increases. At this later point in the suspension travel, because of the increased spring force, squat force has less of manipulating effect on a wheel suspension. A lower amount of anti squat can be used so that more energy can be transferred to forward movement.

DETAILED DESCRIPTION

Vehicles must be accelerated against their environment to propel an operator or rider across terrain. In order to accelerate these vehicles, a certain amount of energy must be exerted and transformed into rotary motion at a wheel or plurality of wheels. Suspended wheeled vehicle energy conversion types are widely varied. Some vehicles like bicycles, tricycles, and pedal cars use converted human energy as the drive unit. Other vehicles use electric motors or combustion engines, as their drive unit. These electric motors and combustion engines extract rotary motion through the controlled release of chemically stored energy.

Almost all vehicle types use some sort of rotary motion transmission system to transfer rotational force from a drive unit to a wheel or plurality of wheels. A simple bicycle or motorcycle or all terrain vehicle uses a chain or belt to transfer power from a drive unit to a wheel. These chain or belt drive transmissions typically use one sprocket in the front which is coupled to a drive system and one sprocket in the rear which is coupled to a wheel.

More complex bicycles, motorcycles, all terrain vehicles, and automobiles use a shaft drive system to transfer power from a drive system to a driven wheel or wheels. These shaft drive systems transfer power through a rotating shaft that is usually reasonably perpendicular to the driven wheel spinning axis, with power transferred to the driven wheel via a bevel, spiral bevel, hypoid, worm gear drivetrain, or some other means. These single sprocket chain and belt, and shaft driven vehicles can use a direct driven single speed arrangement, where drive unit output shaft speed and torque is transferred to the driven wheel at a constant unchanging ratio. These single sprocket chain and belt, and shaft driven vehicles can also use a commonly found multi speed arrangement, where drive unit output shaft speed and torque is transferred to the driven wheel at a variable ratio through operator selected or automatically selected ratio changing mechanisms.

A bicycle with a more advanced design includes gear changing systems that have clusters of selectable front chainrings and rear sprockets. These gear changing systems give the bicycle rider a selectable mechanical advantage for use during powered acceleration. The mechanical advantage selection, allows a rider spinning a front sprocket cluster via crank arms, to attain lower revolution speed and higher torque values, or conversely, higher revolution speed and lower torque values at a driven wheel.

The current invention, in certain embodiments, is directed at suspension systems that can maintain low energy loss under powered acceleration of the vehicle, for example, a bicycle, a motorcycle, a car, an SUV, a truck, or any other kind of vehicle. Suspension systems of the current invention are useful for a large variety of vehicles, including, but not limited to, human powered vehicles, off road use vehicles with long displacement suspension, high efficiency road going vehicles, and other vehicles.

A vehicle suspension system isolates a vehicle chassis from forces imparted on the vehicle when traversing terrain by allowing the vehicle's ground contact points to move away from impacts at the terrain level and in relation to the vehicle chassis by a compressible suspension movement. The compressible suspension movement that isolates a chassis from these impacts is called suspension displacement or suspension travel. Compressible suspension travel has a beginning point where the suspension is in a completely uncompressed state, and an ending point of displacement, where the suspension is in a completely compressed state. Suspension travel displacement is measured in a direction parallel to and against gravity. In certain preferred embodiments, a suspension system of the invention uses a tuned squat curve to provide an amount of squat closer to or higher in the range of the squat condition known as anti squat in the beginning of a suspension travel displacement, and an amount of squat closer to the range of the squat condition known as anti squat than the initial measurement at a later point in the suspension travel displacement. As a suspension system of the invention is compressed, a spring or damper unit is compressed. As this spring or damper unit is compressed, the force output from the unit rises. As the suspended wheel moves through its axle path, spring force at the wheel rises. A suspended wheel has a compressible wheel suspension travel distance that features a beginning travel point where the suspension is completely uncompressed to a point where no further suspension extension can take place, and an end travel point where a suspension is completely compressed to a point where no further suspension compression can take place. At the beginning of the wheel suspension travel distance, when the suspension is in a completely uncompressed state, the spring is in a state of least compression, and the suspension is easily compressed. In certain preferred embodiments, a higher amount of anti squat in the beginning of the suspension travel is needed to keep the suspension from compressing due to mass transfer under acceleration. As the suspension compresses, spring force at the wheel rises. When spring force rises to levels present in the middle of the suspension travel, mass transfer due to acceleration has a much smaller effect on vehicle traction or chassis attitude because the mass transfer is not capable of significantly compressing the suspension system. At this point, in certain preferred embodiments, the present invention decreases anti squat amount so that a greater amount of mass transfer towards the wheel can occur. This mass transfer allows increased wheel traction while transferring more energy towards forward propulsion.

FIG. 1a shows certain embodiments of the invention and it presents a graphical method useful to attain a squat point measurement, and a graphical method to attain suspension geometry kinematical layout from an existing desired measured squat point. Shown in FIG. 1a are the following: driven wheel (1); swinging wheel carrier link (2); upper carrier manipulation link (3); lower carrier manipulation link (4); chain force vector (5); driving force vector (6); squat force vector (7); upper carrier manipulation link force vector (8); lower carrier manipulation link force vector (9); squat definition point (10); squat layout line (11); lower squat measurement definition line (12); measured squat distance (13); driven wheel axle path (14); driven wheel suspension travel distance (15); vehicle chassis (16); center of the driven wheel tire to ground contact patch (31).

Figure 1B:
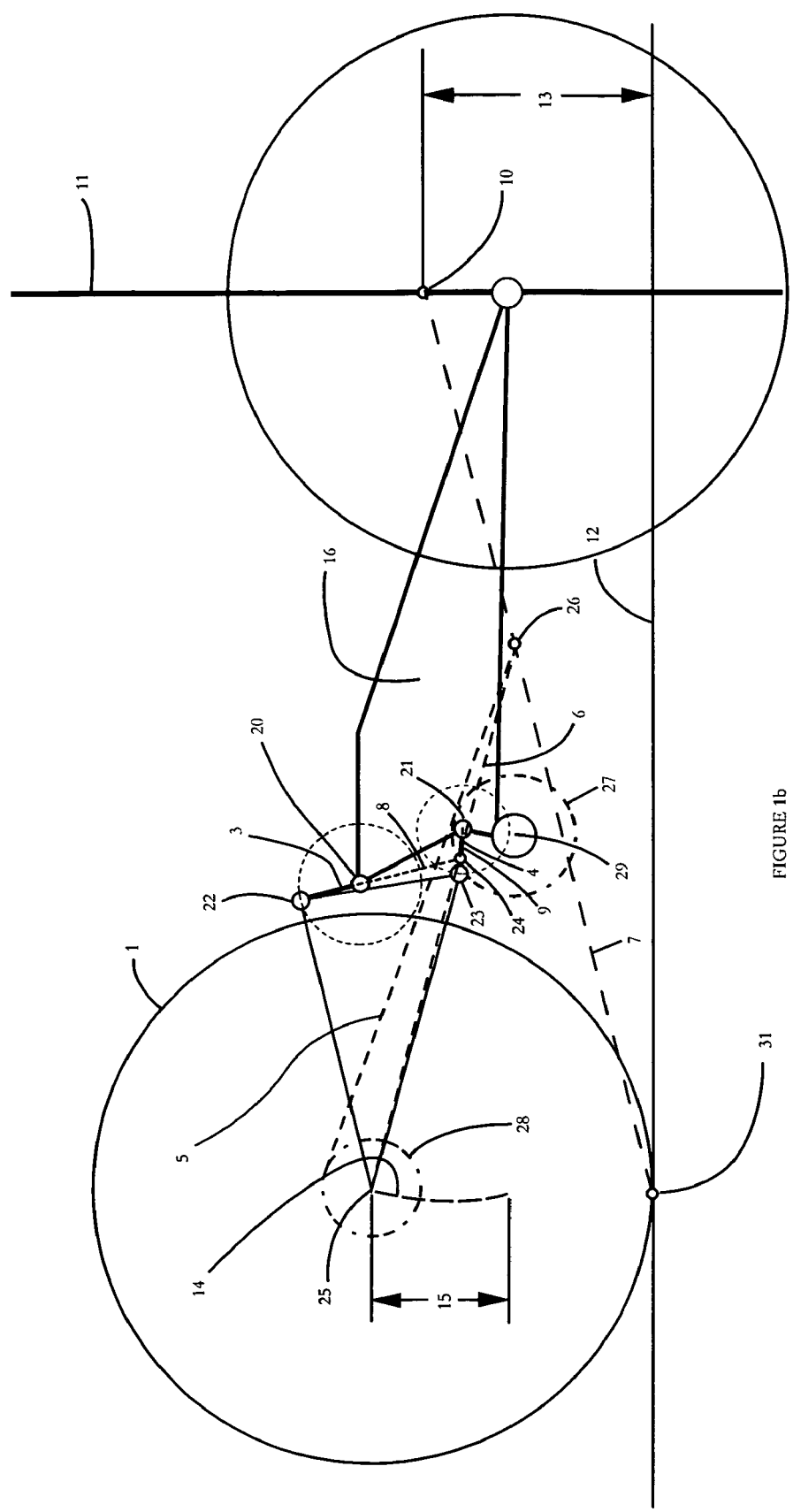
FIG. 1b is a side view of a chain driven vehicle as shown in FIG. 1a with the driven wheel suspension system in a completely compressed state.

FIG. 1a exemplifies that as the driven wheel 1 suspension system is completely uncompressed in its driven wheel suspension travel distance 15, its squat force vector 7 is shown in relation to the vehicle chassis 16. The squat force vector's 7 measured squat distance 13 which is measured as the perpendicular distance between the lower squat measurement definition line 12 and the squat definition point 10, is also shown in FIG. 1a. As the suspension system is compressed through its driven wheel suspension travel distance 15, change in measured squat distance 13 over the driven wheel suspension travel distance 15 is used to create a squat curve 17. FIG. 1b shows a side view of a chain driven vehicle as shown in FIG. 1a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 1b in addition to what is presented in FIG. 1a, are the following: upper link fixed pivot (20); lower link fixed pivot (21); upper link floating pivot (22); lower link floating pivot (23); instant force center (24); driven wheel rotation axis (25); chain force vector and driving force vector intersection point (26); driving cog (27); driven cog (28); driving cog rotation axis (29).

Figure 3:
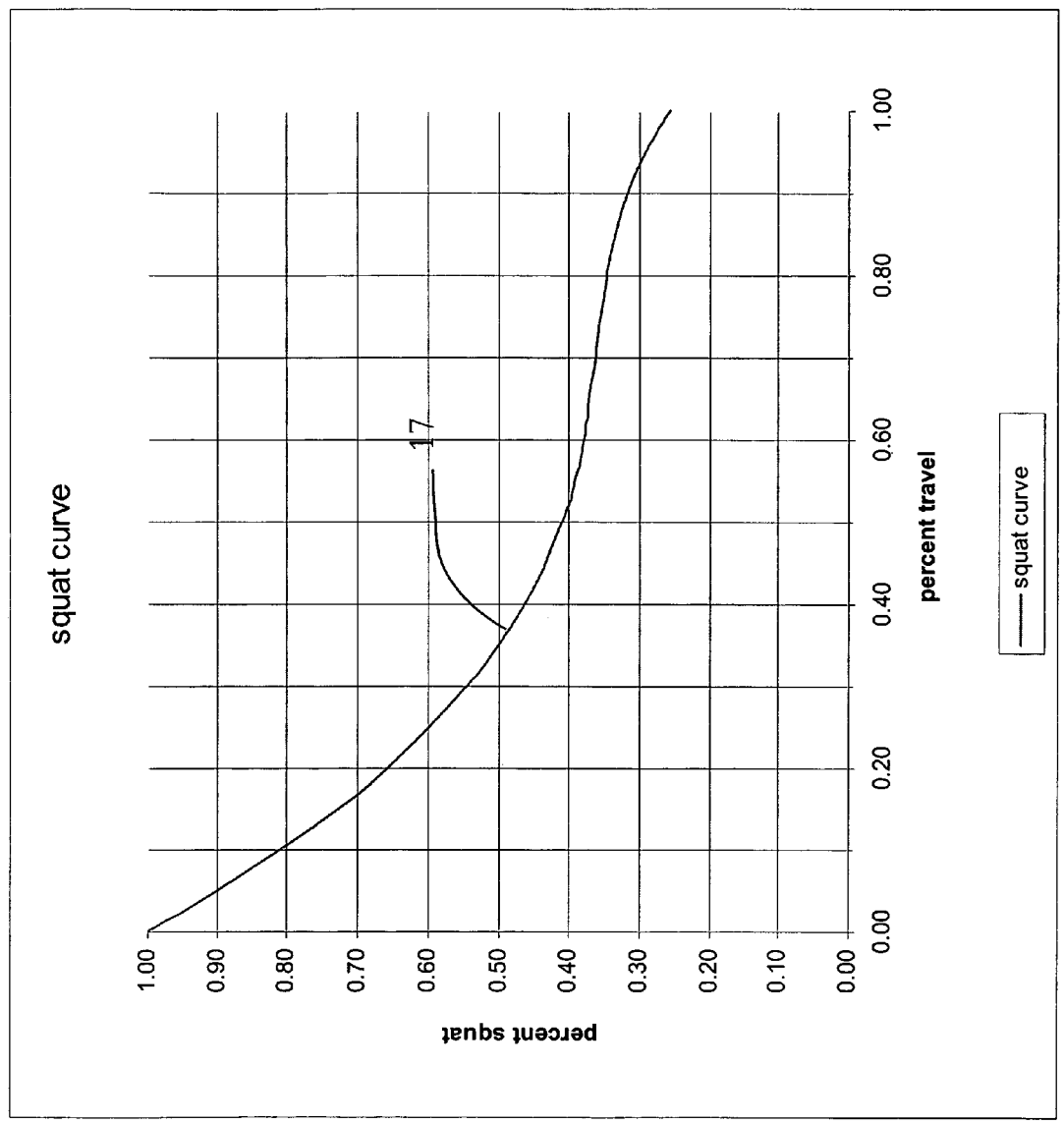
FIGS. 3 and 4 show squat curves for suspension systems according to certain embodiments of the invention graphed on a squat curve graph as disclosed herein.
Figure 4:
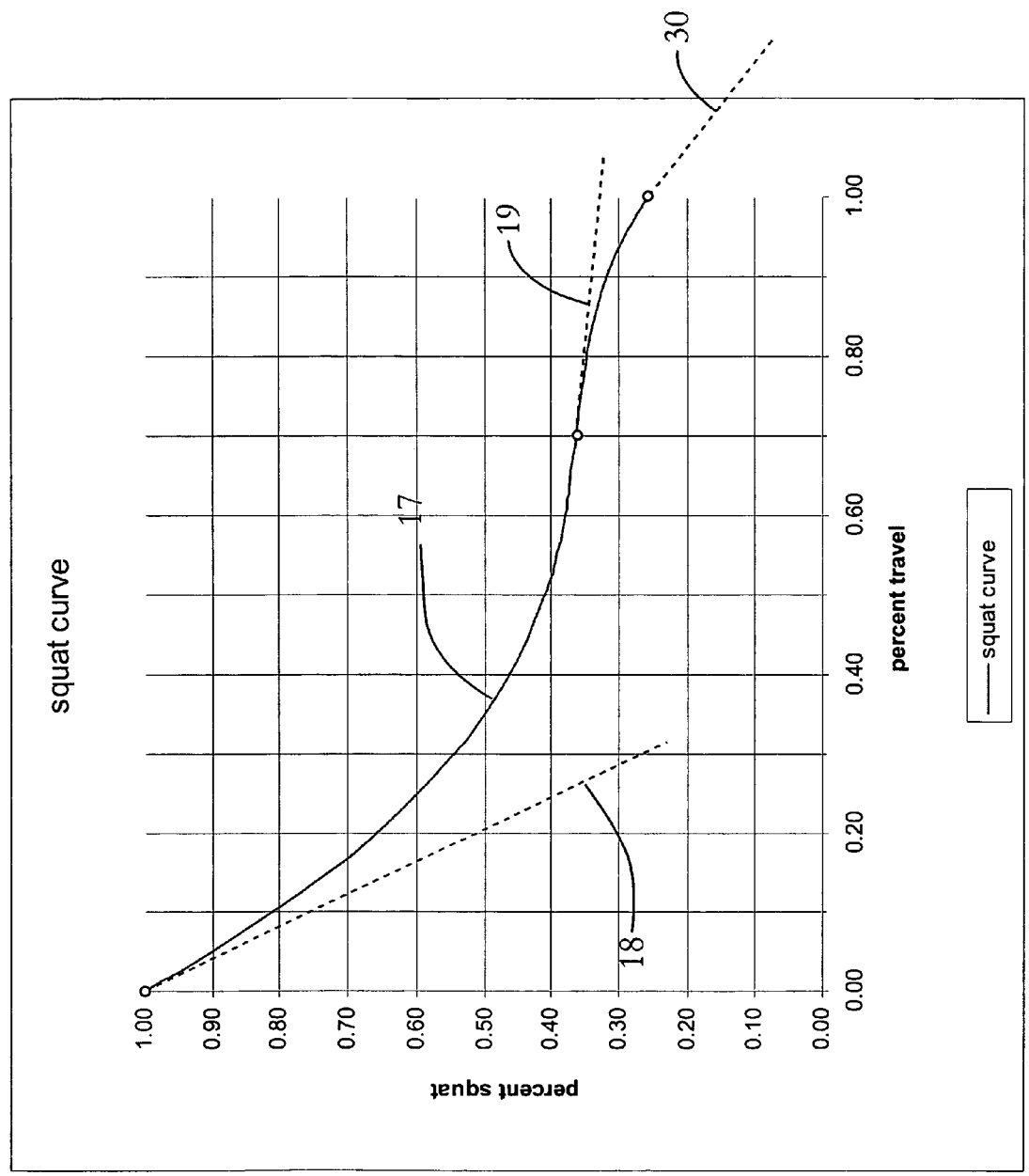
Figure 5:
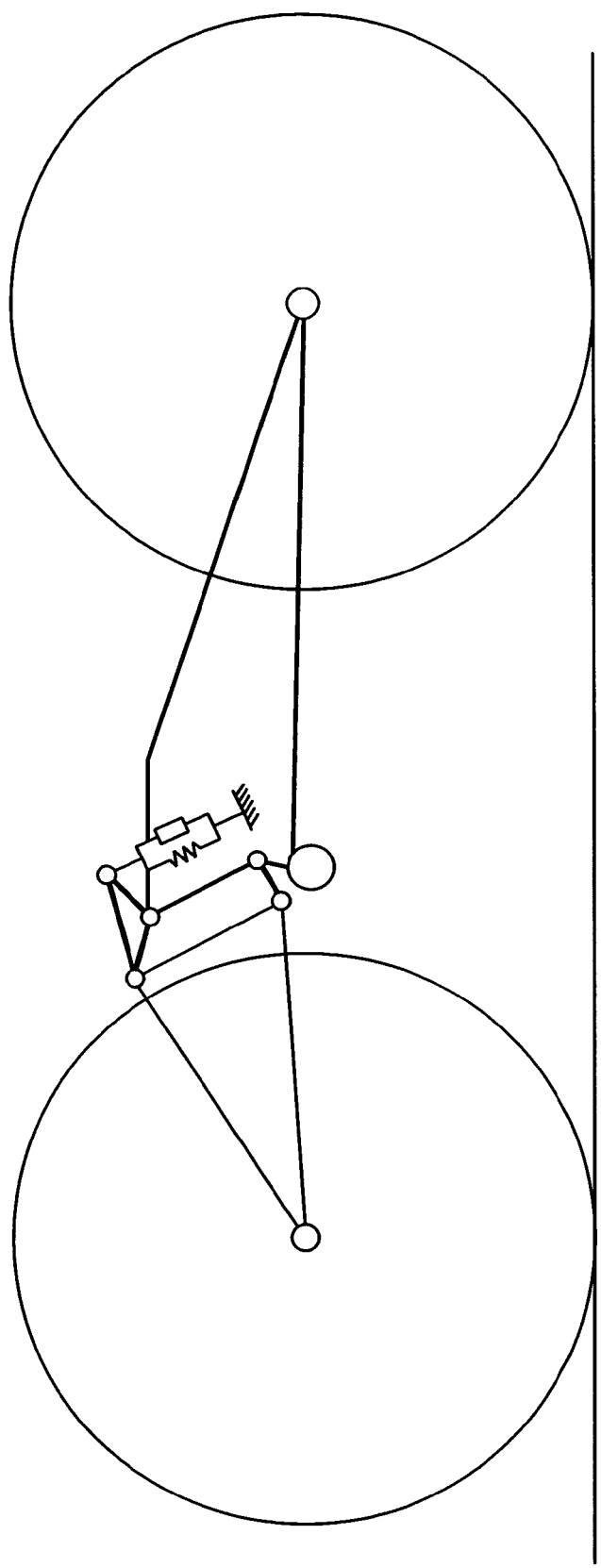
FIGS. 5–13 show alternative embodiments of suspension systems comprising a squat curve of the invention. Each embodiment shown includes a spring/damper unit (small irregular box) and different frame members (thicker lines) interconnected through pivots (small circles).
Figure 6:
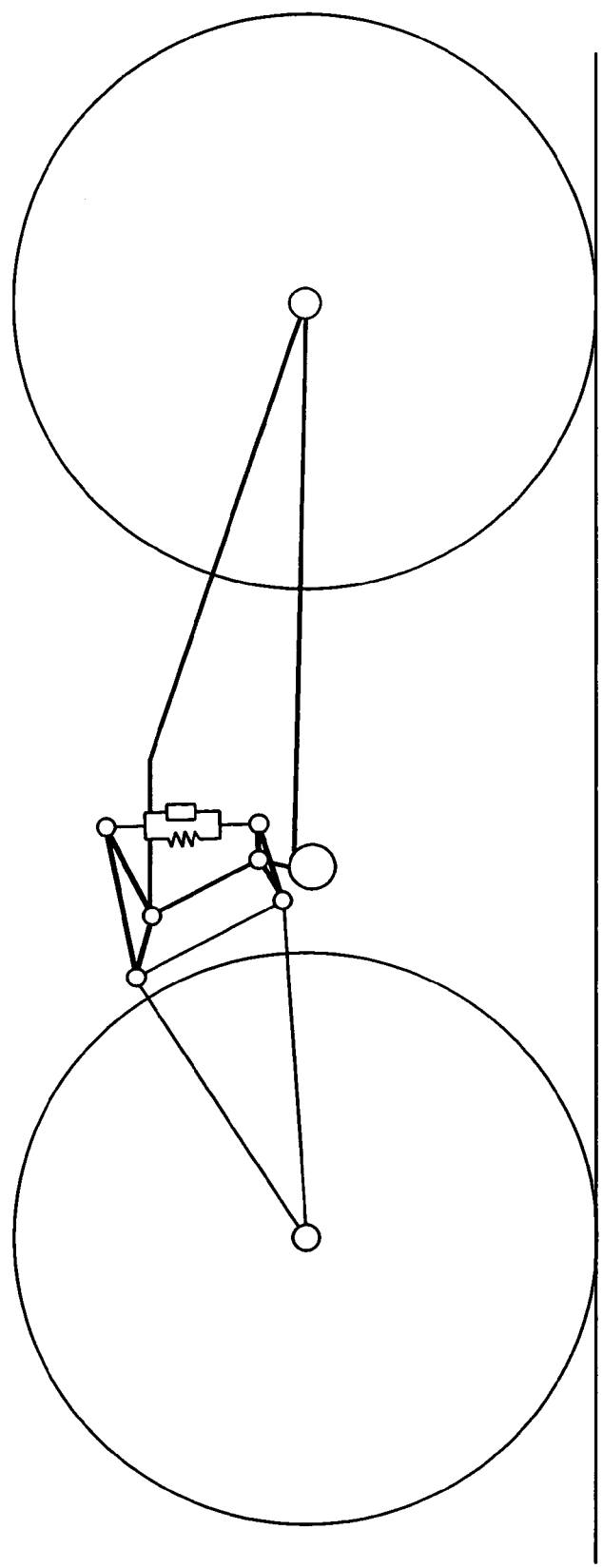
Figure 7:
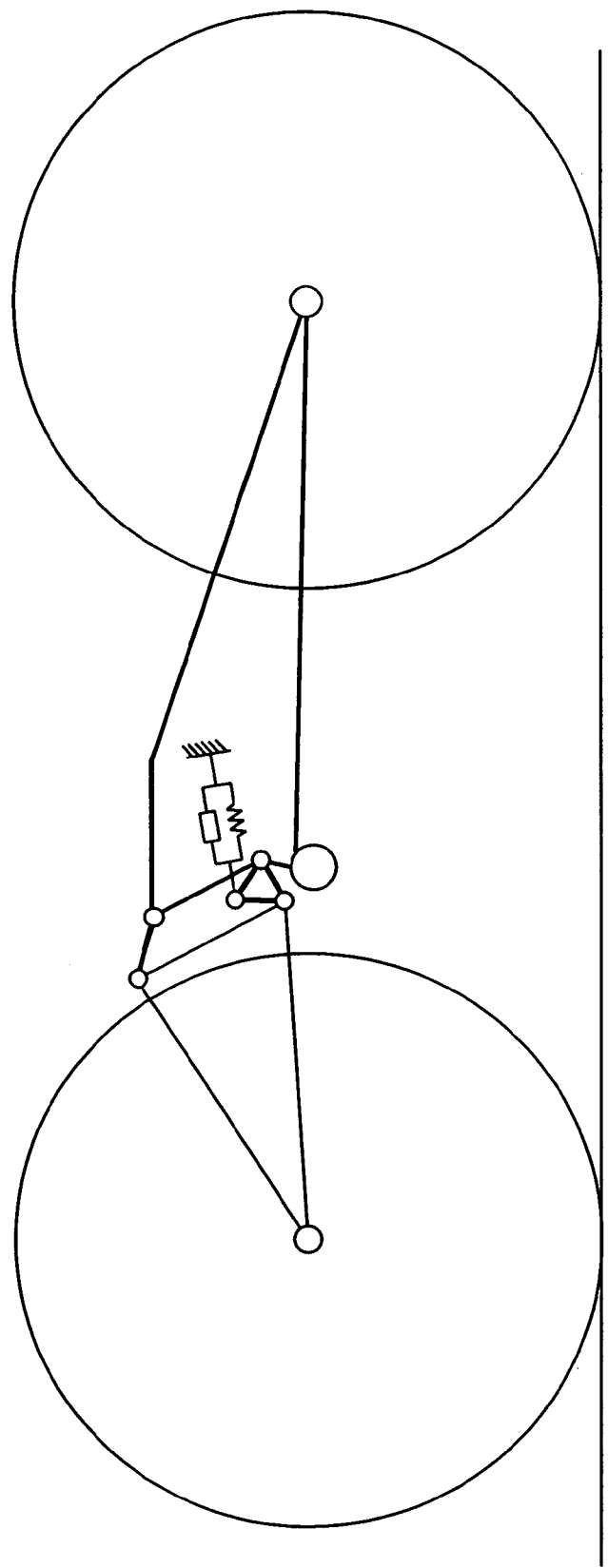
Figure 8:
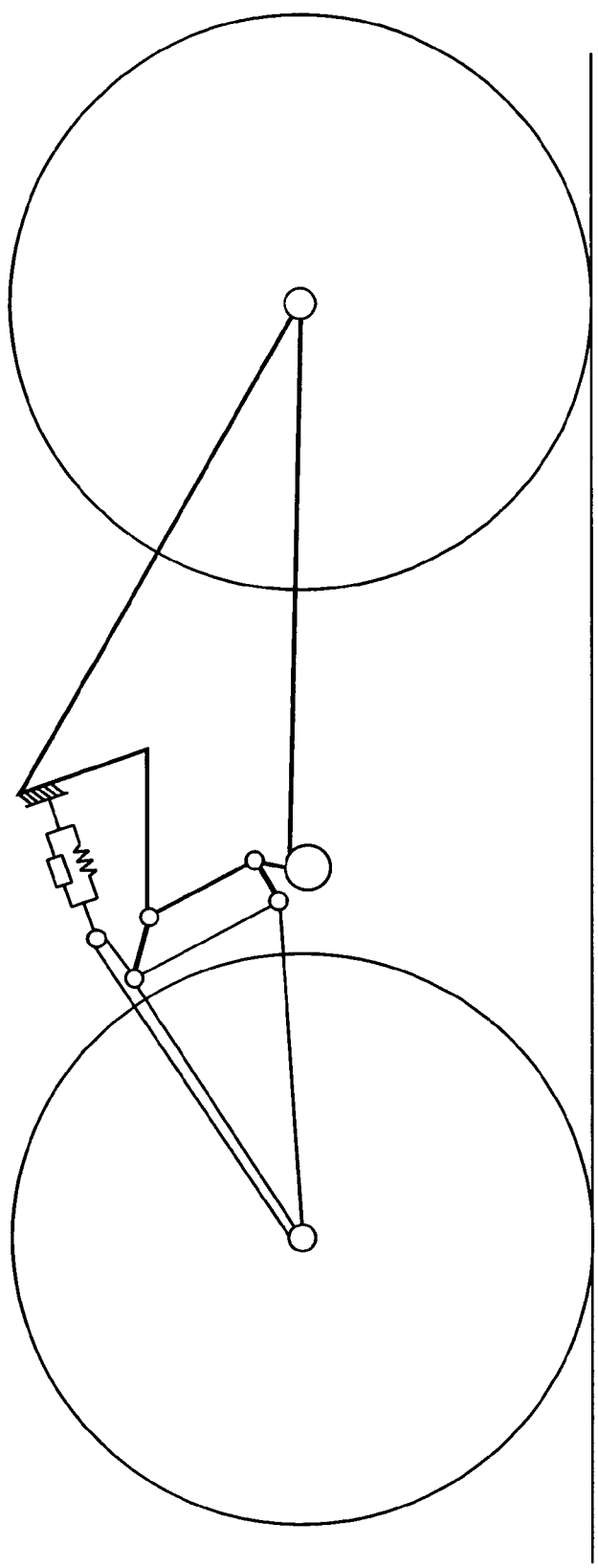
Figure 9:
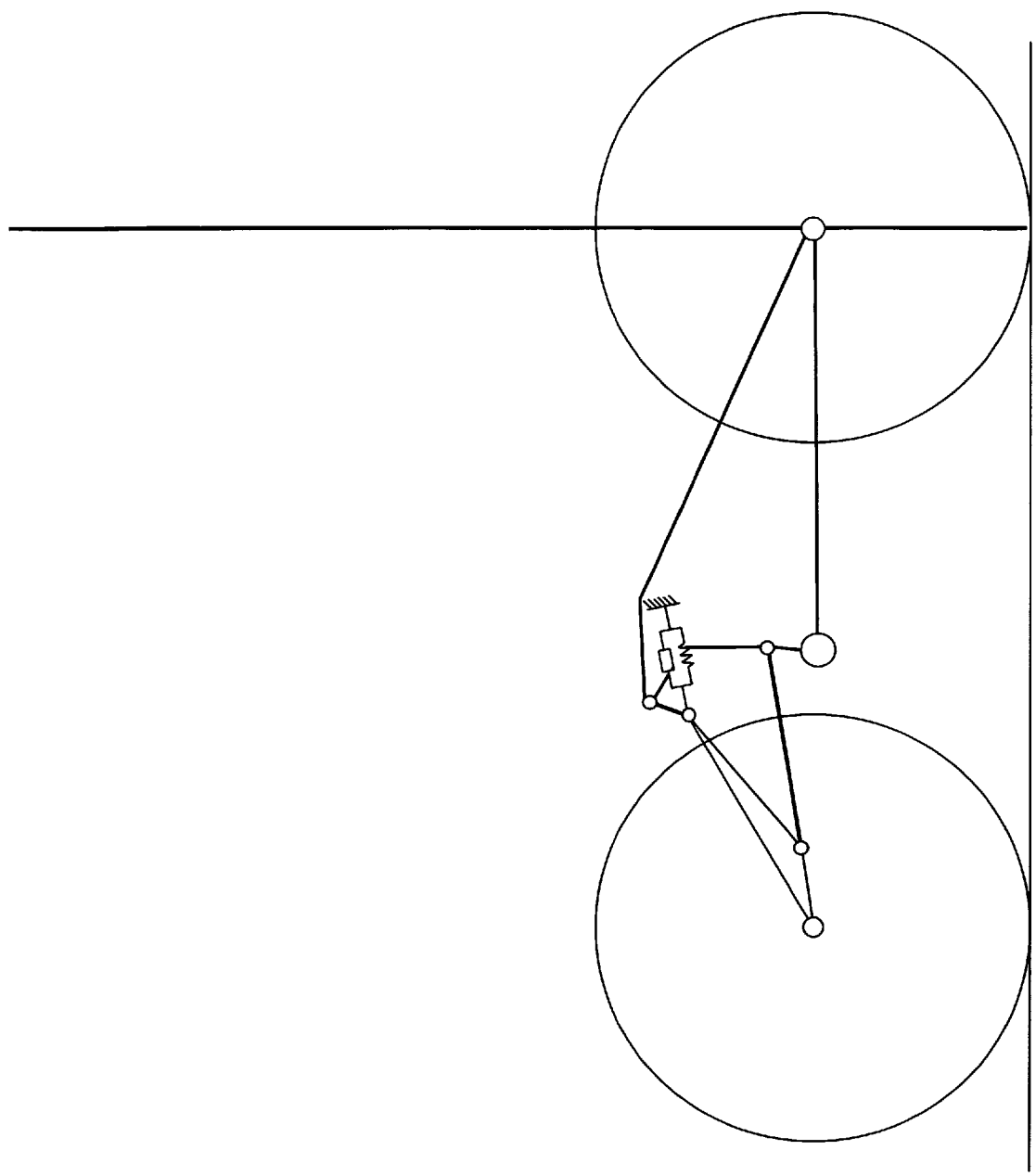
Figure 10:
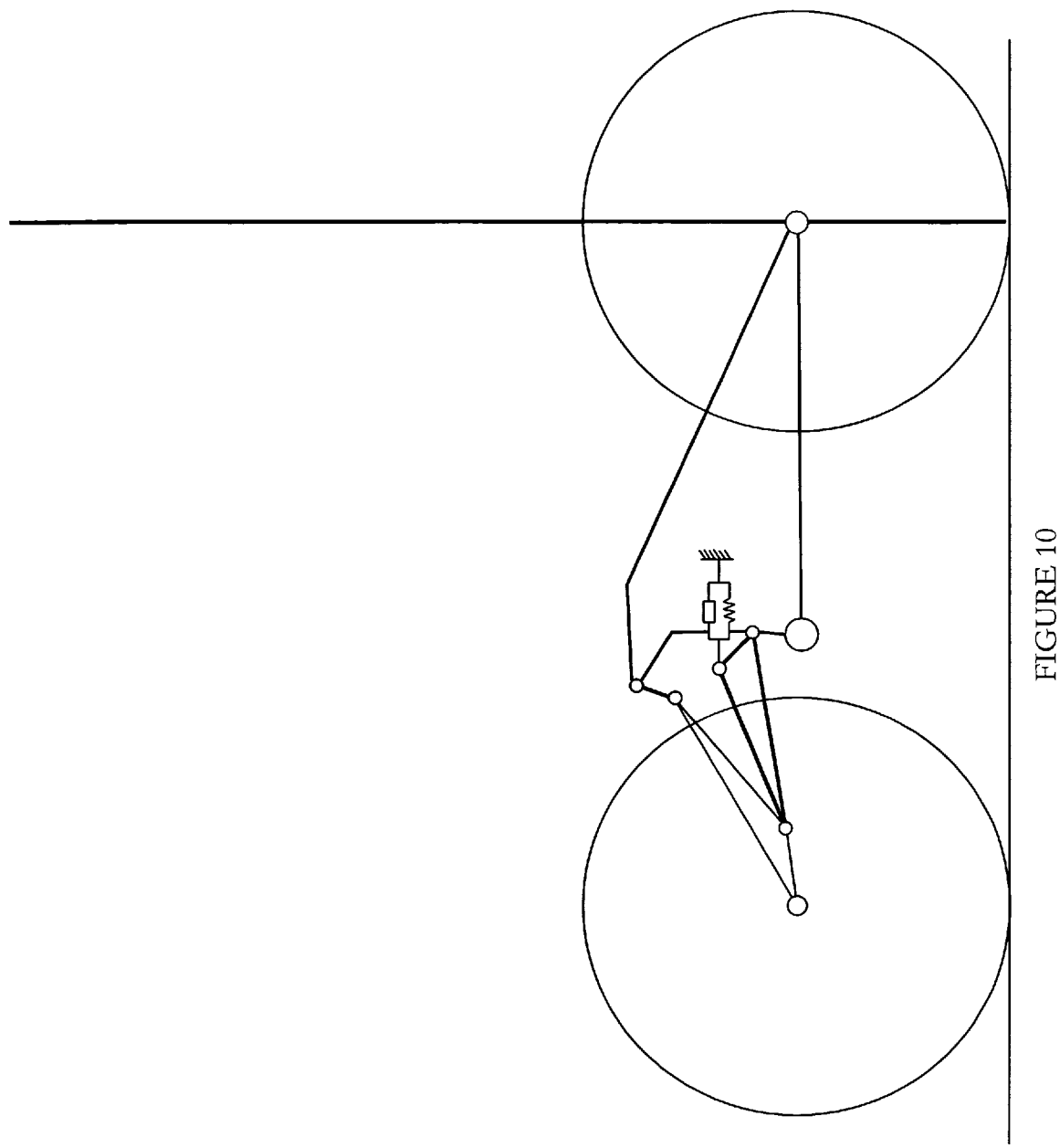
Figure 11:
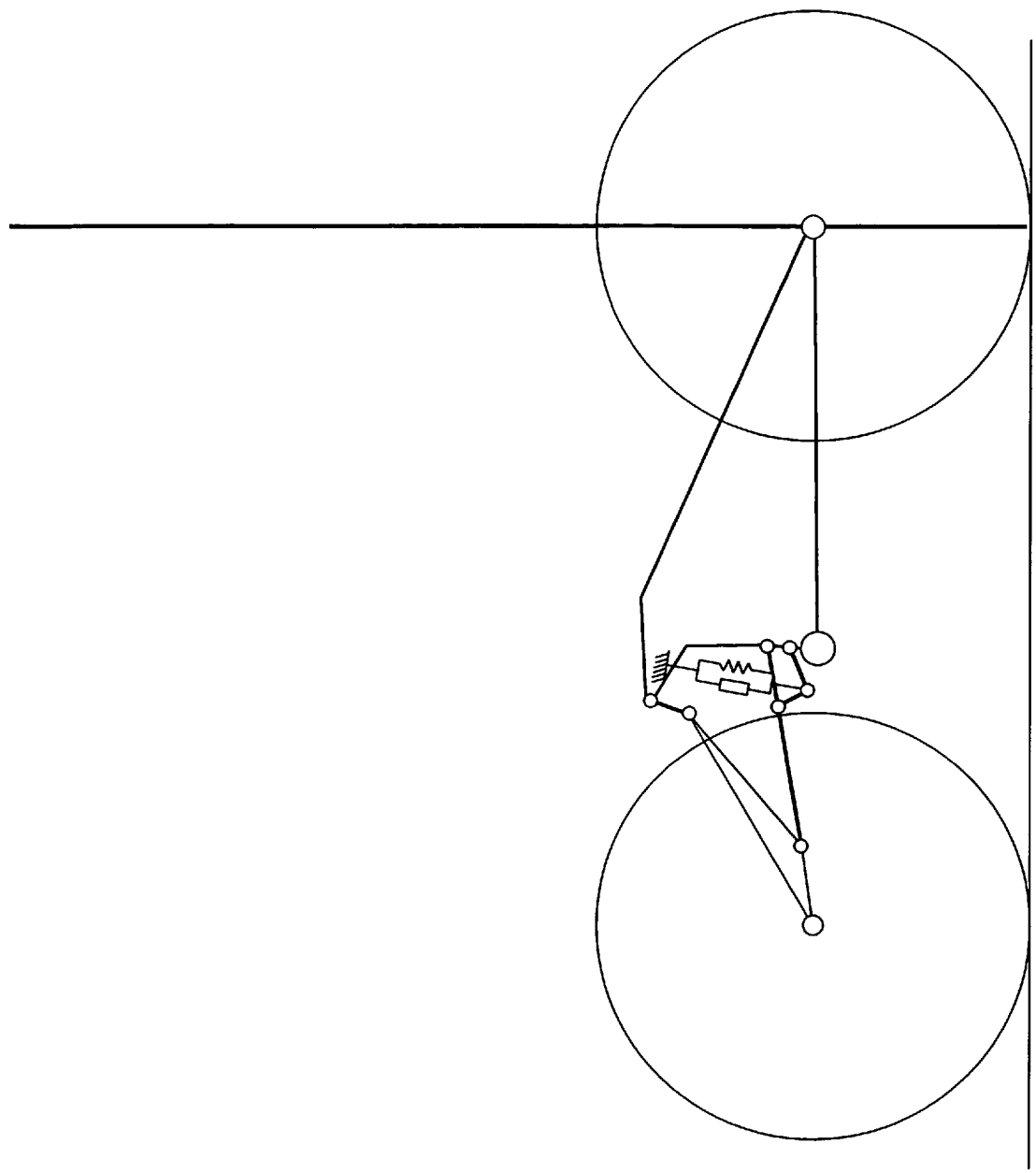
Figure 12:
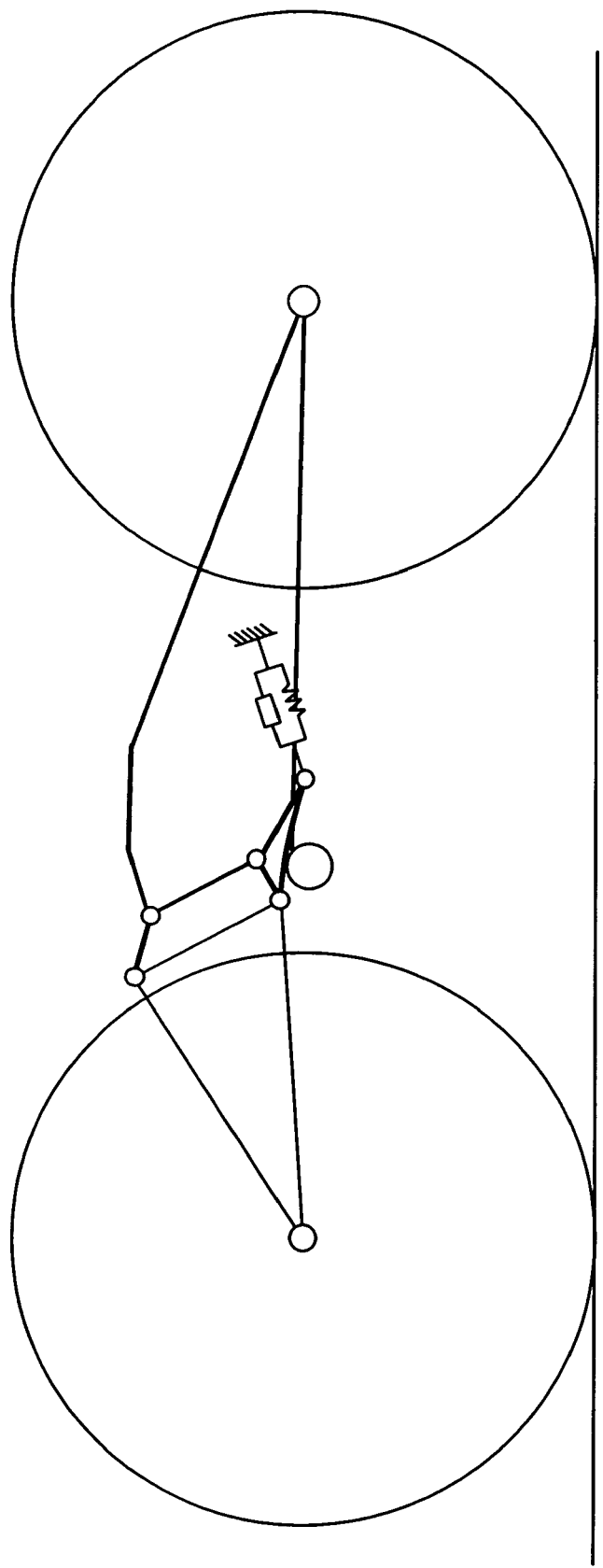
Figure 13:
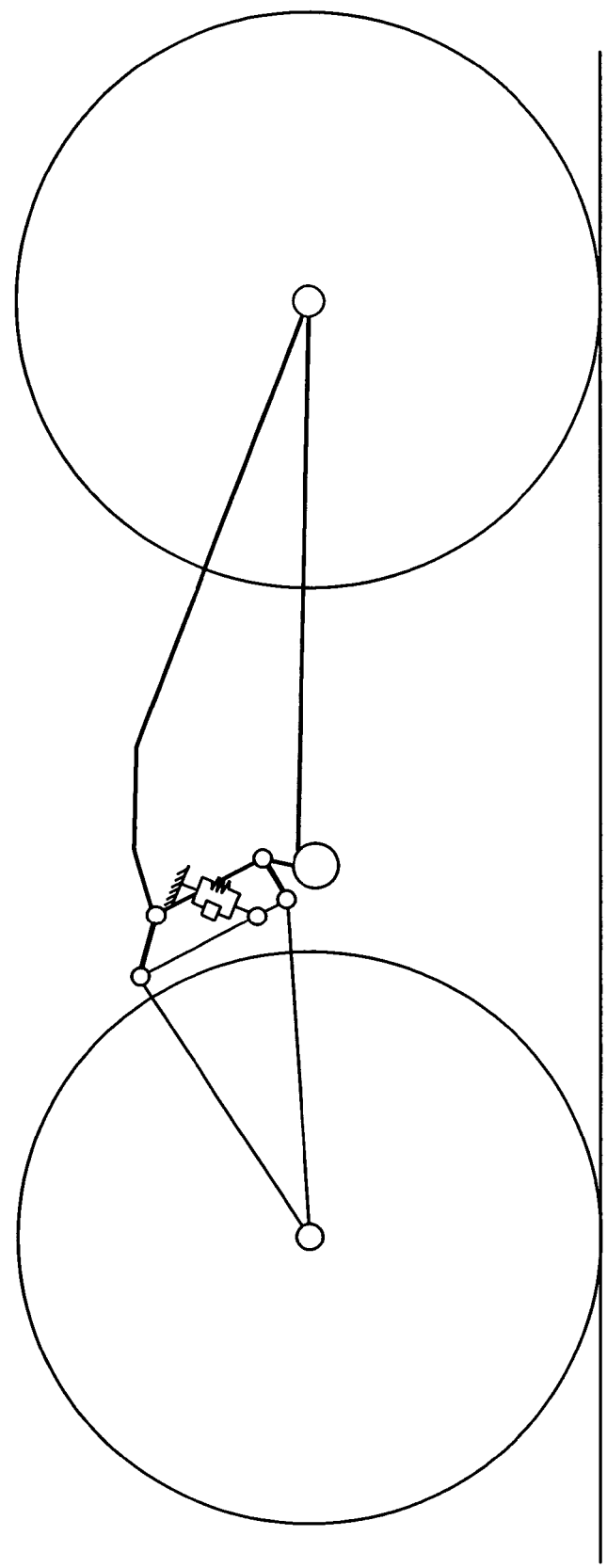

FIG. 1b exemplifies that as the driven wheel 1 suspension system is completely compressed through its driven wheel suspension travel distance 15, its squat force vector 7 moves in relation to the vehicle chassis 16. The squat force vector's 7 measured squat distance 13, which is measured as the perpendicular distance between the lower squat measurement definition line 12 and the squat definition point 10, decreases in relation to the measured squat distance 13 shown in FIG. 1a. This change in measured squat distance 13 over the driven wheel suspension travel distance 15, in certain preferred embodiments, is used to create a squat curve 17. FIG. 1b shows the graphical method used to obtain a squat curve 17 from chain driven vehicle geometry, or chain driven vehicle geometry from a squat curve 17. In the vehicle shown in FIG. 1b, a driven wheel 1 is attached to a swinging wheel carrier link 2, which pivots at one end of an upper carrier manipulation link 3. The upper carrier manipulation link 3 is pivotally attached to the vehicle chassis 16 at the upper link fixed pivot 20. A lower carrier manipulation link 4 is also attached to the swinging wheel carrier link 2. This lower carrier manipulation link 4 is attached to the vehicle chassis 16 at a lower link fixed pivot 21. An upper carrier manipulation link force vector 8 is graphed coincident to the swinging wheel carrier link 2 upper pivot and the upper link fixed pivot 20. The upper carrier manipulation link force vector 8 is graphed so that it intersects a lower carrier manipulation link force vector 9, which is graphed coincident to the swinging wheel carrier link 2 lower pivot and the lower link fixed pivot 21. The intersection point of the upper carrier manipulation link force vector 8, and the lower carrier manipulation link force vector 9 is called the instant force center 24. A driving force vector 6 is graphed beginning at the driven wheel rotation axis 25, and passes through the instant force center 24. A chain force vector 5 is drawn tangent to the tops of the driving cog 27 and driven cog 28, and intersects the driving force vector 6 at a chain force vector and driving force vector intersection point 26. The squat force vector 7 is graphed from a beginning point at the center of the driven wheel tire to ground contact patch 31, and passes through the chain force vector and driving force vector intersection point 26, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat curve 17 in a squat curve graph as shown in FIGS. 3 and 4.

Figure 1C:
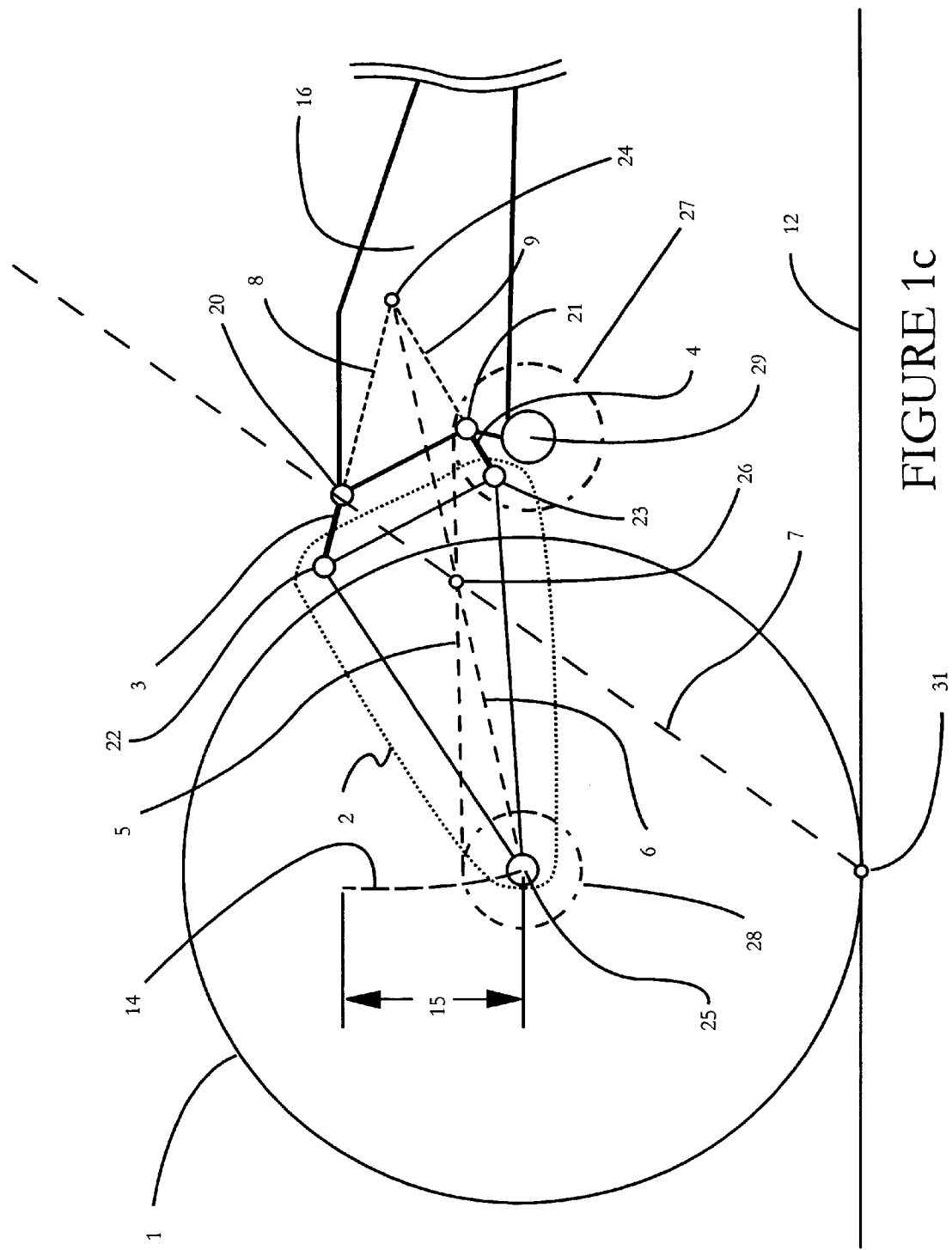
FIG. 1c is an enlarged section of the side view of the chain driven vehicle shown in FIGS. 1a and 1b with the driven wheel suspension system in a completely uncompressed state.

FIG. 1c shows an enlarged section of the side view of the chain driven vehicle shown in FIGS. 1a and 1b with the driven wheel suspension system in a completely uncompressed state.

Figure 1D:
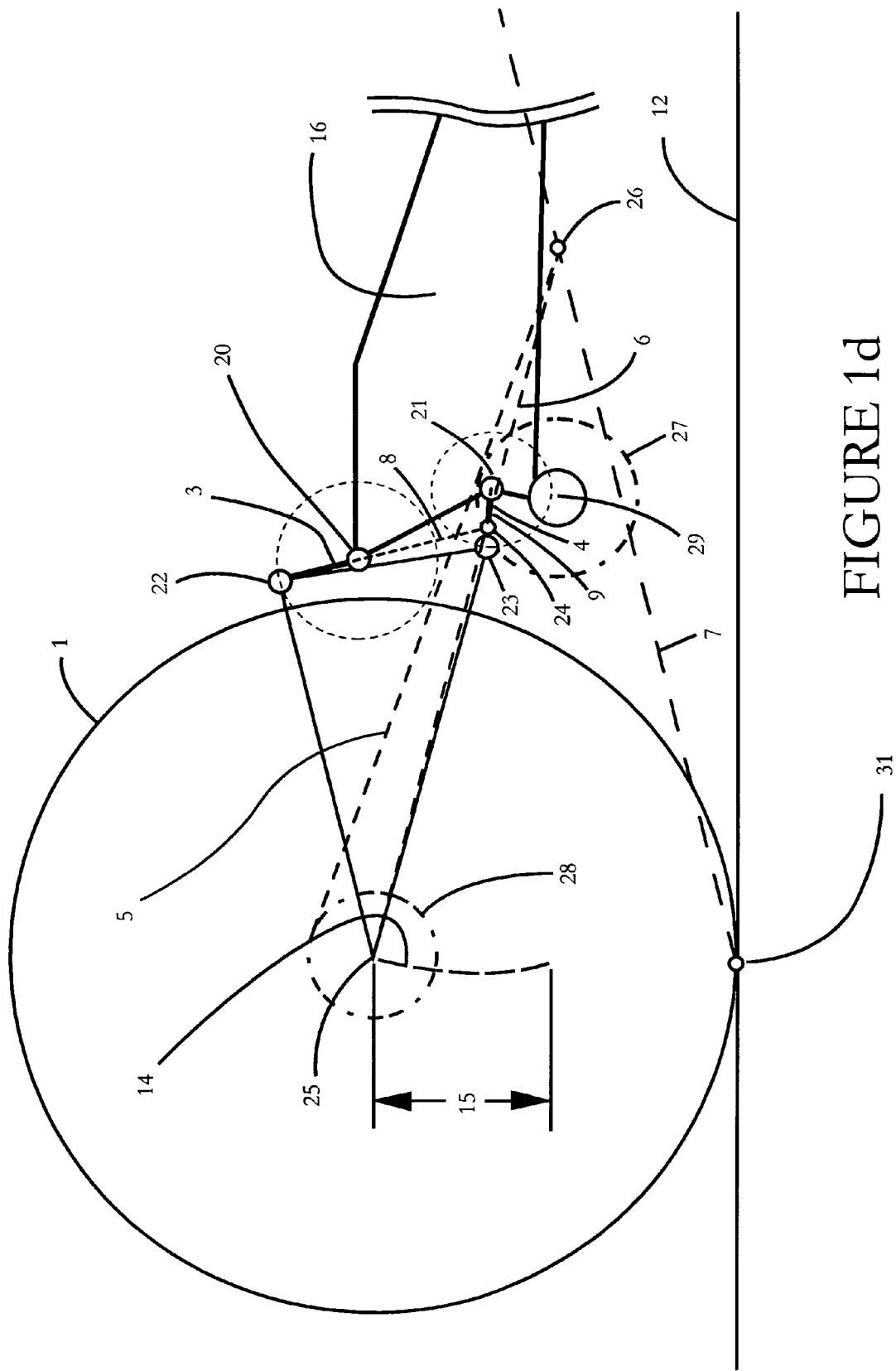
FIG. 1d is an enlarged section of the side view of the chain driven vehicle shown in FIGS. 1a, 1b, and 1c with the driven wheel suspension system in a completely compressed state.

FIG. 1d shows an enlarged section of the side view of the chain driven vehicle shown in FIGS. 1a, 1b, and 1c with the driven wheel suspension system in a completely compressed state. FIGS. 1c and 1d further exemplify certain embodiments, for example, points and vectors useful for a graphical method used to attain a squat point measurement, and a graphical method to attain suspension geometry kinematical layout from an existing desired measured squat point.

Figure 2A:
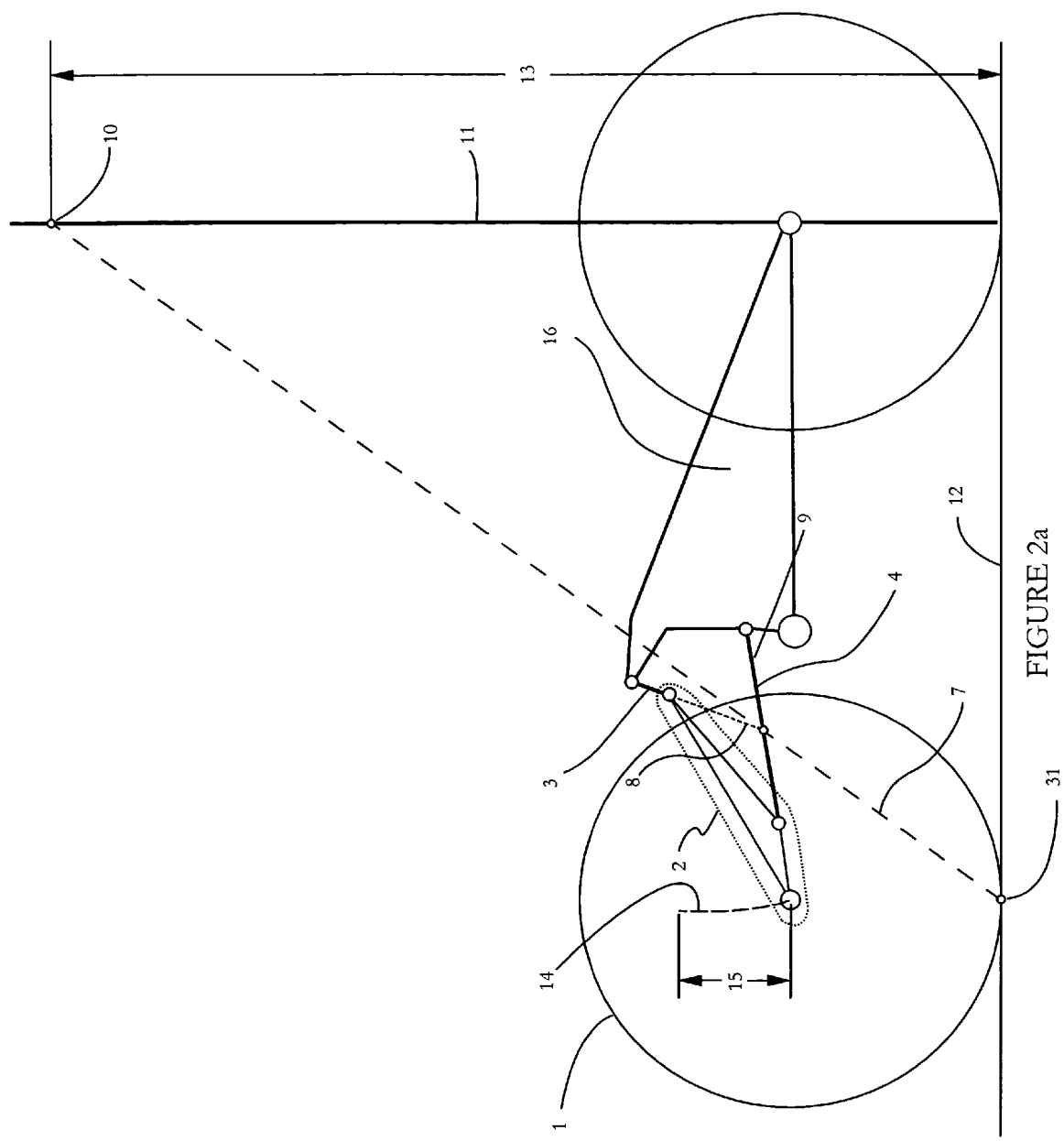
FIG. 2a is a side view of a shaft driven vehicle using a driven wheel suspension system that achieves a squat curve according to certain embodiments of the current invention. The vehicle is shown with the driven wheel suspension system in an uncompressed state.

FIG. 2a shows certain embodiments of the invention and it presents a graphical method useful to attain a squat point measurement, and a graphical method to attain suspension geometry kinematical layout from an existing desired measured squat point. Shown in FIG. 2a are the following: driven wheel (1); swinging wheel carrier link (2); upper carrier manipulation link (3); lower carrier manipulation link (4); squat force vector (7); upper carrier manipulation link force vector (8); lower carrier manipulation link force vector (9); squat definition point (10); squat layout line (11); lower squat measurement definition line (12); measured squat distance (13); driven wheel axle path (14); driven wheel suspension travel distance (15); vehicle chassis (16); center of the driven wheel tire to ground contact patch (31).

FIG. 2a exemplifies that as the driven wheel 1 suspension system is completely uncompressed in its driven wheel suspension travel distance 15, its defined squat force vector 7 is shown in relation to the vehicle chassis 16. The squat force vector's 7 measured squat distance 13, which is measured as the perpendicular distance between the lower squat measurement definition line 12 and the squat definition point 10, is shown in FIG. 2a. As the suspension system is compressed through its driven wheel suspension travel distance 15, change in measured squat distance 13 over the driven wheel suspension travel distance 15 is used to create a squat curve 17.

Figure 2B:
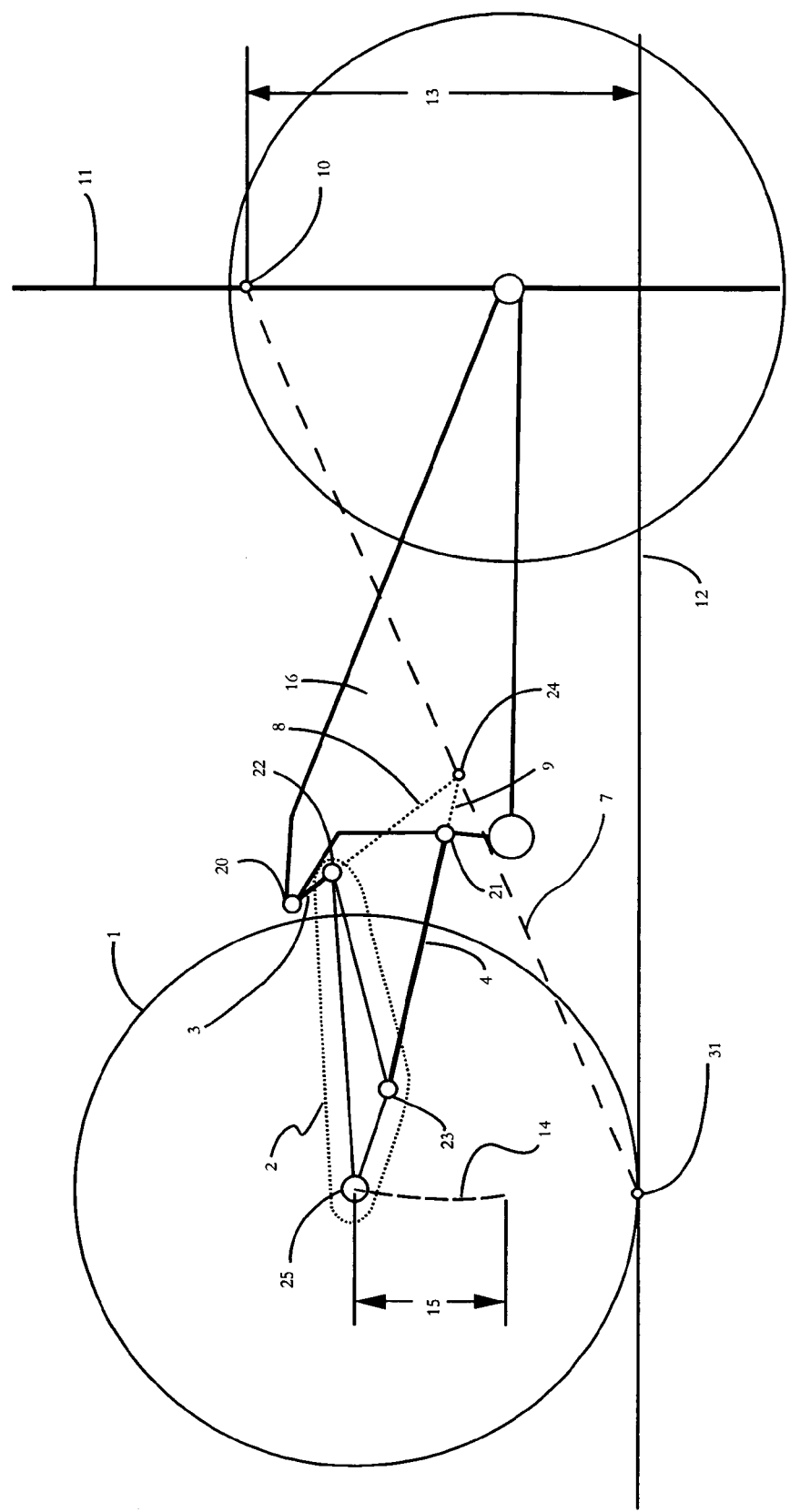
FIG. 2b is a side view of a shaft driven vehicle as shown in FIG. 2a with the driven wheel suspension system in a completely compressed state.

FIG. 2b shows a side view of a shaft driven vehicle as shown in FIG. 2a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 2b in addition to what is presented in FIG. 2a, are the following: upper link fixed pivot (20); lower link fixed pivot (21); upper link floating pivot (22); lower link floating pivot (23); instant force center (24); driven wheel rotation axis (25); chain force vector and driving force vector intersection point (26); driving cog (27); driven cog (28); driving cog rotation axis (29).

FIG. 2b exemplifies that as the driven wheel 1 suspension system is completely compressed through its driven wheel suspension travel distance 15, its defined squat force vector 7 moves in relation to the vehicle chassis 16. The squat force vector's 7 measured squat distance 13 which is measured as the perpendicular distance between the lower squat measurement definition line 12 and the squat definition point 10, decreases in relation to the measured squat distance 13 shown in FIG. 2a. This change in measured squat distance 13 over the driven wheel suspension travel distance 15 is used to create a squat curve 17. FIG. 2b shows the graphical method used to obtain a squat curve 17 from shaft driven vehicle geometry, or shaft driven vehicle geometry from a squat curve 17. In the vehicle shown in FIG. 2b, a driven wheel 1 is attached to a swinging wheel carrier link 2, which pivots at one end of an upper carrier manipulation link 3. The upper carrier manipulation link 3 is pivotally attached to the vehicle chassis 16 at the upper link fixed pivot 20. A lower carrier manipulation link 4 is also attached to the swinging wheel carrier link 2. This lower carrier manipulation link 4 is attached to the vehicle chassis 16 at a lower link fixed pivot 21. An upper carrier manipulation link force vector 8 is graphed coincident to the swinging wheel carrier link 2 upper pivot and the upper link fixed pivot 20. The upper carrier manipulation link force vector 8 is graphed so that it intersects a lower carrier manipulation link force vector 9, which is graphed coincident to the swinging wheel carrier link 2 lower pivot and the lower link fixed pivot 21. The intersection point of the upper carrier manipulation link force vector 8, and the lower carrier manipulation link force vector 9 is called the instant force center 24. The squat force vector 7 is graphed from a beginning point at the center of the driven wheel tire to ground contact patch 31, and passes through the instant force center 24, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat curve 17 in a squat curve graph as shown in FIGS. 3 and 4.

Figure 2C:
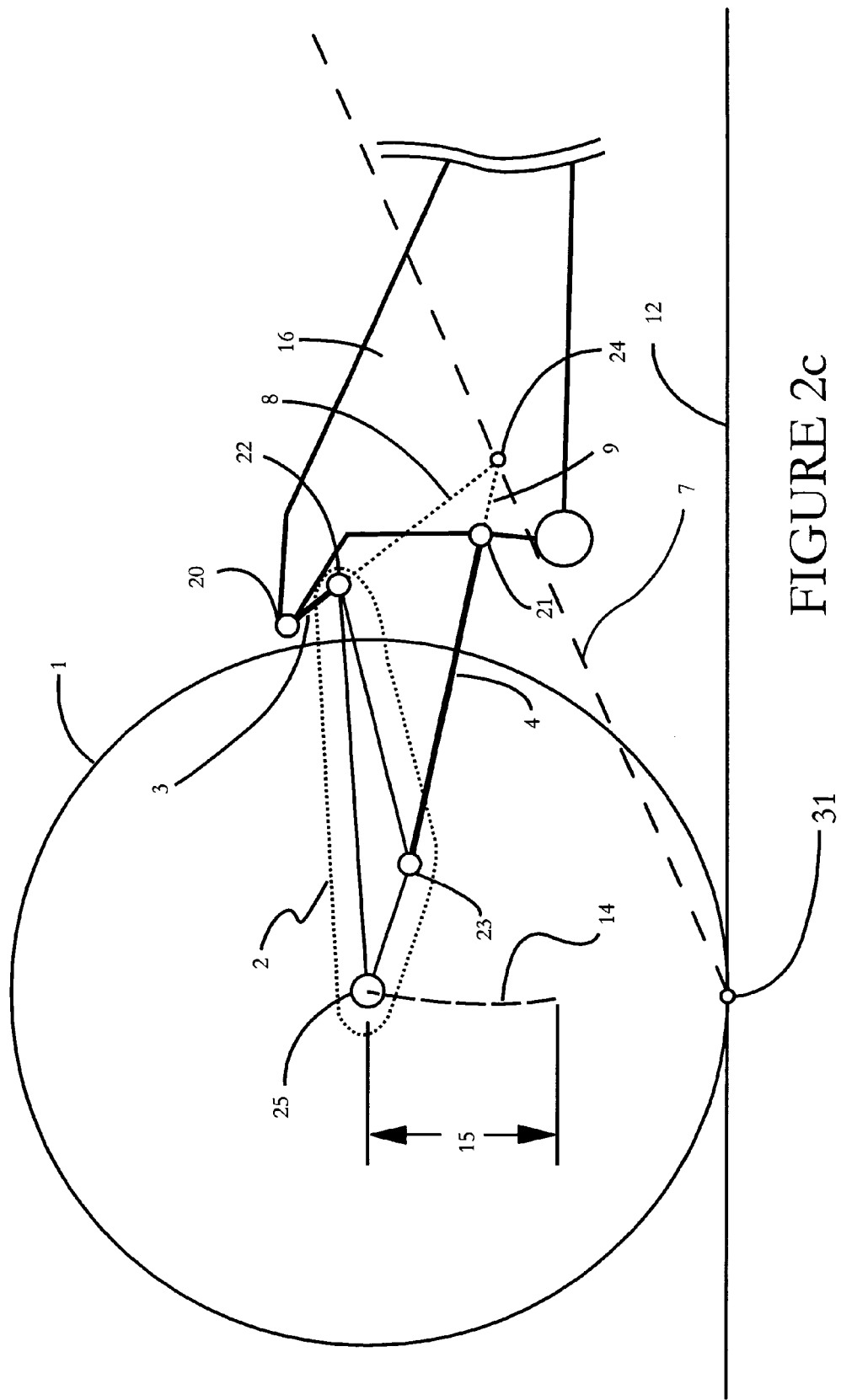
FIG. 2c is an enlarged section of the side view of the shaft driven vehicle shown in FIGS. 2a and 2b with the driven wheel suspension system in a completely uncompressed state.

FIG. 2c shows an enlarged section of the side view of the shaft driven vehicle shown in FIGS. 2a and 2b with the driven wheel suspension system in a completely uncompressed state.

Figure 2D:
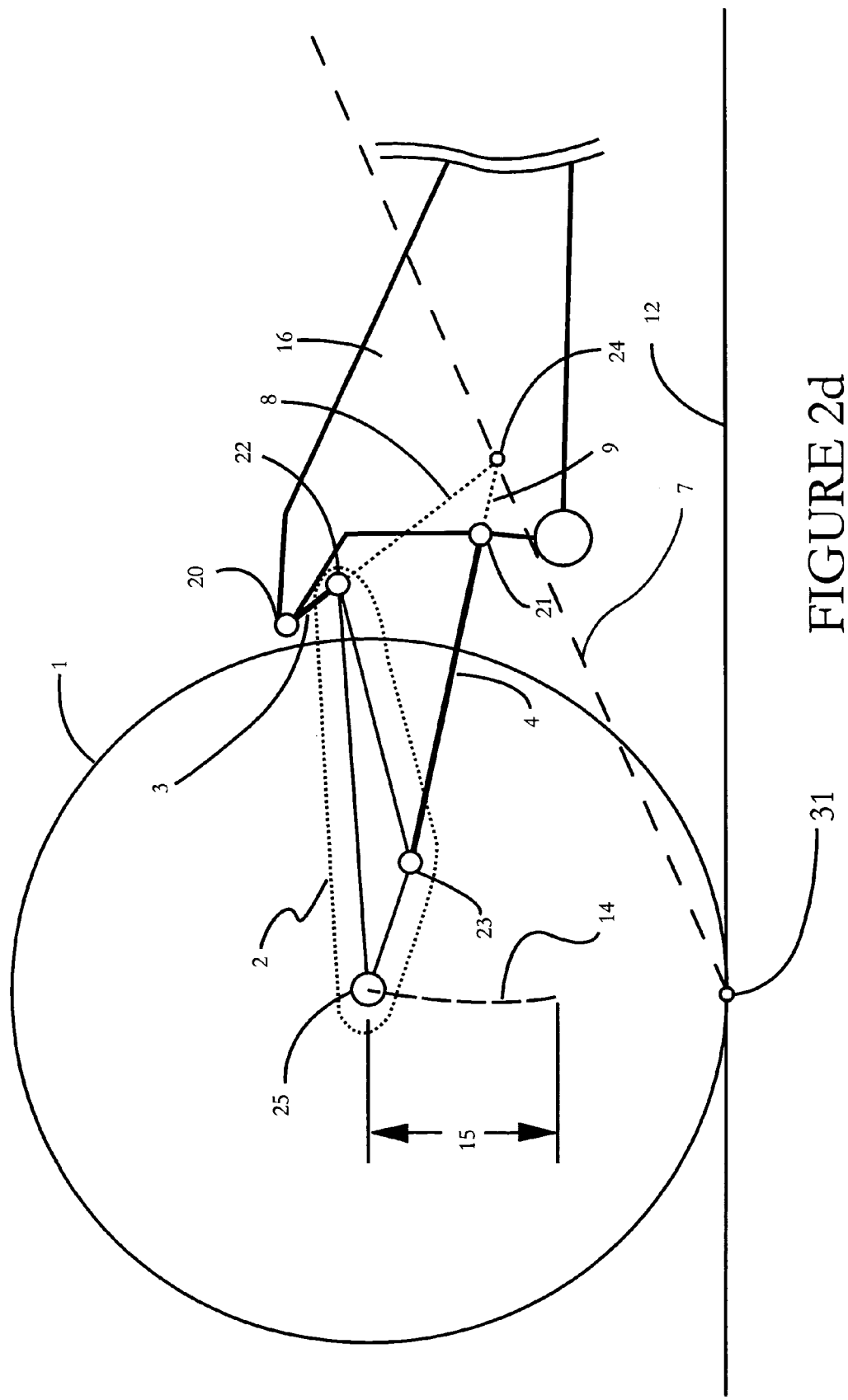
FIG. 2d is an enlarged section of the side view of the shaft driven vehicle shown in FIGS. 2a, 2b, and 2c with the driven wheel suspension system in a completely compressed state.

FIG. 2d shows an enlarged section of the side view of the shaft driven vehicle shown in FIGS. 2a, 2b, and 2c with the driven wheel suspension system in a completely compressed state. FIGS. 2c and 2d further exemplify certain embodiments, for example, points and vectors useful for a graphical method used to attain a squat point measurement, and a graphical method to attain suspension geometry kinematical layout from an existing desired measured squat point.

FIG. 3 shows a squat curve for suspension systems according to certain embodiments of the invention graphed on a squat curve graph as disclosed herein. The percent of total suspension travel is shown on the x-axis, and the percent of total squat is shown on the y-axis. FIG. 3 exemplifies a squat curve (17). The slope and shape of the squat curve shown in FIG. 3 exemplifies a squat curve produced by suspension systems of the invention, for example, suspension systems including features as illustrated in FIGS. 1a–1d and FIGS. 2a–2d. FIG. 3 also exemplifies a graphical method useful to obtain a squat curve graph.

FIG. 4 shows a squat curve for suspension systems according to certain embodiments of the invention. The percent of total suspension travel is shown on the x-axis, and the percent of total squat is shown on the y-axis. FIG. 4 exemplifies a squat curve 17 with tangent lines depicting a slope of the curve at certain points along the squat curve. The slopes exemplified by the tangent lines are the first squat curve slope 18, the second squat curve slope 19, and the third squat curve slope 30. FIG. 4 exemplifies a slope of the squat curve 17 as produced by a suspension system of certain embodiments of the current invention, for example, a suspension system including features as illustrated in FIGS. 1a–1d and FIGS. 2a–2d, and that the slope varies as the vehicle suspension travel distance increases. The squat curve 17 produced has a first squat curve slope 18 that has a negative value at the beginning point in the suspension travel, and a second squat curve slope 19 at an interim point that is higher, or less negative, than the first squat curve slope 18 in the suspension travel, and a third squat curve slope 30 at the ending point in the suspension travel that has a lower, or more negative, value than the second squat curve slope 19.

FIGS. 5–13 show alternative embodiments of suspension systems comprising a squat curve of the invention. Each embodiment shown includes a spring/damper unit (small irregular box) and different frame members (thicker lines) interconnected through pivots (small circles).

Mass transfer is discussed. All vehicles have mass. The mass of a suspended static vehicle system can be modeled as shown in the FIG. 1. Mass in all vehicles with a suspension system can be divided into sprung and unsprung mass. Unsprung mass is comprised of the sum of all vehicle parts that move with a suspended wheel. Sprung mass is comprised of the sum of vehicle parts that can remain stationary as a suspended wheel is moved. The dynamic center of the sprung mass as shown in FIG. 2 is a combination of rider and/or passenger mass and the vehicle mass.

The combination of a rider's mass and the sprung mass of the bicycle are always supported fully by the combination of the vehicle's tires. Powered forward acceleration transfers mass from the vehicle's front wheel(s) to the vehicle's driven wheel(s), braking transfers mass from the vehicle's front wheel(s) to the vehicle's driven wheel(s). Riding on the driven wheel(s) only transfers all of the mass to the driven wheel(s), and riding on the front wheel(s) only transfers all of the mass to the front wheel(s).

Due to their combination of short wheelbase (WB) and high center of gravity (CG), motorcycles and bicycles experience the affects of load transfer to a much greater extent than other vehicles in existence. The ratio of the distance from the ground to the CG and the distance between the points where the wheels touch the ground (WB) illustrates this point. For example, a common bicycle will exhibit a center of gravity to wheelbase ratio of nearly 100%, motorcycles are typically near 50%, and passenger cars are typically near 25%. Mass transfer is sometimes also referred to as load transfer.

Energy loss through mass transfer is discussed. One undesirable effect of driven wheel suspension systems is the loss of energy in the way of extreme suspension compression or extension during powered acceleration. This suspension compression or extension is categorized as squat.

A suspension system's geometry and positional relationships between the vehicle drive system components can greatly affect the internal distribution of forces within the vehicle chassis. As a suspension system cycles through its suspension travel, the positional relationships between the suspension system and the vehicle drive system can change, and at the same time, the suspension geometry itself will change. These fluctuations of internal forces are what govern suspension response to powered acceleration and braking. Vehicle attitude in relation to gravity, and sprung weight center of mass change will also govern suspension response to powered acceleration and braking. These external forces are considered stationary and equal when comparing like vehicles in order to determine squat characteristics.

Squat is the result of internal chassis forces that can cause a rear suspension to extend or compress during powered acceleration. Squat is an instantaneous condition that can vary throughout the suspension travel. Instantaneous squat response is governed by sprung mass CG placement, suspension geometry, powertrain component location, and grade in relation to gravity that the vehicle is traveling on. Sprung mass CG placement only defines the amount of squat present in a suspension, and does not change the squat conditions. The squat conditions define the direction of squat force in relation to gravity.

There are three squat conditions that must be considered. The first condition is pro-squat, and describes the condition present when a rear suspension is forced to compress by internal suspension forces under powered acceleration. The second condition is anti-squat. Anti-squat describes the condition present when a rear suspension compression is counteracted by internal suspension forces under powered acceleration. The third condition is zero-squat. Zero-squat occurs only at the instant in between pro-squat and anti-squat, where no suspension manipulating forces are present under powered acceleration. A vehicle suspension operating at the point of zero-squat will not use acceleration forces to manipulate suspension reaction in any way.

Squat force works independent of the spring force that supports a suspended vehicle. Because the squat force is independent of the vehicle spring force, when under acceleration, a vehicle suspension is acted upon by its spring and the squat force together. Suspended vehicles use springs to support the vehicle chassis and dampers to dissipate impact energy when the suspension system is compressed and extended while the vehicle travels over rough terrain. Springs can be in the form of compressive gas springs, leaf springs, or coil springs, and dampers can use fluid or friction to dissipate energy. When a vehicle is at rest, suspended wheels are compressed a certain amount so that the suspended wheel can follow irregular road surfaces with both bumps and dips. The spring that supports a wheel suspension acts as an energy storage device. Vehicle suspensions use the damper units to dissipate energy stored in a spring after the spring is compressed. The further a spring is compressed, the more energy is stored, and the more energy will be dissipated by the damper when the spring rebounds. Because spring force increases as a wheel is compressed into its suspension travel, force at the suspended wheel also increases.

Squat curve graphing is discussed. A squat curve graph is a representation of the squat produced by a compressible suspension system under powered acceleration. The squat curve graph is laid out so that the percentage of suspension travel is graphed on the X axis, and escalating in a positive direction. The minimum suspension travel, which is zero percent suspension compression, is shown at the far left of the x-axis, and the maximum suspension travel, which is represented by 100 percent suspension compression, is shown at the far right of the x-axis. Percent suspension compression is measured and graphed in minimum increments of 5 percent total suspension compression; measured Percent total squat is graphed on the y-axis in an escalating amount. The highest amount of squat is defined as 100 percent, and is represented at the top of the y-axis. These values are taken directly from the squat points which are measured from graphed squat points on the squat layout line. Measurement is taken at a perpendicular distance from the lower squat measurement definition line. Zero percent squat is always measured at the point of zero squat condition. This zero squat condition is measured when the squat point lies directly on the lower squat measurement definition line. At this point, the squat measurement has no value. Any measurement of a squat point that lies below the lower squat definition line is equal to a pro squat amount, and must be graphed as a negative percentage of the 100 percent squat value. The amount of squat closer to or highest in the range of the squat condition known as anti squat is listed as the highest positive squat value, and lower amounts of anti squat, zero squat, and pro-squat are listed as lower percentages of the highest anti squat value. Zero squat is shown when the squat curve crosses or terminates at zero value on the y-axis, and pro squat is graphed as a negative y-axis percentage below the x-axis. For example, if a squat curve begins with a measurement that is measured 100 millimeters above the lower squat measurement definition line, at a point of zero suspension compression, this point will be graphed at a value of 1 on the y-axis, and 0 on the x-axis. If a later point is measured 100 millimeters below the lower squat measurement definition line, at a point of 100 percent suspension compression, this point will be graphed at a value of −1 on the y-axis, and 1 on the x-axis. In the squat curve graph, the distance set to equal 100 percent suspension travel and the distance set to equal 100 percent squat should be set as equal distances. Therefore, the distance between zero value for squat to maximum value for squat will be equal to the graphed distance between zero value for suspension compression to maximum value for suspension compression. When desired squat point values are known and graphed versus their corresponding percent measured suspension compression values, the points can be connected from point to point using typical graphing method A curve can then be fit to the point to point graph so that the curve represents a smoothed best fit version of the point to point graph. The most efficient method to obtain such a curve is to use a computer program such as Microsoft Excel, available from Microsoft Corporation, One Microsoft Way, Redmond, Wash. 98052-6399, USA. Using Microsoft Excel, a user can input the escalating suspension travel measurements beginning with the zero percent measurement and ending with the 100 percent measurement, and can input the measured or preferred squat point measurements that coincide with their percent suspension travel measurements. Microsoft Excel then can be used to create a graph of the points with a curve fit to the graphed points. This graphed curve is the discussed squat curve.

Slope of a squat curve between two points on a curve is defined by the standard coordinate geometry equation: slope=rise/run. A squat curve that has a squat amount at zero suspension travel, with 20 percent less squat at a point 10 percent into the wheel suspension travel compression will have a slope of −2, because per the equation slope=rise/run, −0.2/0.1=−2. A squat curve that has a pro squat amount at zero suspension travel, with 20 percent more pro squat at a point 10 percent into the wheel suspension travel compression will have a slope of −2, because per the equation slope=rise/run, −0.2/0.1=−2. A squat curve can be produced for any wheel suspension system by graphing the percent of squat throughout the suspension travel.

In certain embodiments, a suspension system according to the invention has a squat curve with a negative, or decreasing, slope. In certain preferred embodiments, the slope of the squat curve is more negative at the beginning of suspension travel than in the interim, or mid range, of suspension travel. In certain other preferred embodiments, the slope of the squat curve is more negative at the end of suspension travel than in the interim, or mid range, of suspension travel. In certain other preferred embodiments, the slope of the squat curve is more negative at the beginning of suspension travel than at the end of suspension travel.

In certain embodiments, the beginning of the suspension travel is 0 to 50 percent, or about 0 to about 50 percent, of suspension travel; or 0 to 40 percent, or about 0 to about 40 percent, of suspension travel; or 0 to 30 percent, or about 0 to about 30 percent, of suspension travel; or 0 to 20 percent, or about 0 to about 20 percent, of suspension travel; or 0 to 10 percent, or about 0 to about 10 percent, of suspension travel; or 0 to 5 percent, or about 0 to about 5 percent, of suspension travel; or 0 or about 0 percent of suspension travel. In certain embodiments, the interim, or mid range, of the suspension travel is 25 to 75 percent, or about 25 to about 75 percent, of suspension travel; or 30 to 70 percent, or about 30 to about 70 percent, of suspension travel; or 35 to 65 percent, or about 35 to about 65 percent, of suspension travel; or 40 to 60 percent, or about 40 to about 60 percent, of suspension travel; or 45 to 55 percent, or about 45 to about 55 percent, of suspension travel; or 50 percent or about 50 percent, of suspension travel; or 60 to 80 percent, or about 60 to about 80 percent, of suspension travel; or 65 to 75 percent, or about 65 to about 75 percent, of suspension travel; or 70 percent or about 70 of suspension travel; or 50 to 60 percent, or about 50 to about 60 percent, of suspension travel. In certain embodiments, the end of the suspension travel is 70 to 100 percent, or about 70 to about 100 percent, of suspension travel; or 75 to 100 percent, or about 75 to about 100 percent, of suspension travel; or 80 to 100 percent, or about 80 to about 100 percent, of suspension travel; or 85 to 100 percent, or about 85 to about 100 percent, of suspension travel; or 90 to 100 percent, or about 90 to about 100 percent, of suspension travel; or 95 to 100 percent, or about 95 to about 100 percent, of suspension travel; or 100 or about 100 percent of suspension travel.

In certain embodiments, a suspension system of the invention has a squat curve with a slope in the beginning of suspension travel of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5. In certain embodiments, a suspension system of the invention has a squat curve with a slope in the interim, or mid range, of suspension travel of −0.0001 to −5, or about −0.0001 to about −5; of −0.01 to −4.0, or about −0.01 to about −4.0; of −0.1 to −3.0, or about −0.1 to about −3.0; of −0.2 to −2.0, or about −0.2 to about −2.0; of −0.3 to −1.2, or about −0.3 to about −1.2; of −0.4 to −0.8, or about −0.4 to about −0.8. In certain embodiments, a suspension system of the invention has a squat curve with a slope in the end of suspension travel of −0.0002 to −1000, or about −0.0002 to about −1000; of −0.1 to −500, or about −0.1 to about −500; of −0.2 to −50, or about −0.2 to about −50; of −0.3 to −10, or about −0.3 to about −10; of −0.4 to −5.0, or about −0.4 to about −5.0; of −0.6 to −2.0, or about −0.6 to about −2.0.

Graphical kinematical squat curves are discussed. Graphical methods can be used to determine suspension kinematical layout used to attain a desired squat curve for a suspension. For shaft drive and chain drive vehicles, graphical layout is identical until factoring in the unique features of each powertrain. Any suspended wheel in a vehicle has an axle path that a wheel follows when a suspension is moved through suspension travel. The curvature of this axle path and its layout in relation to specific powertrain components define a squat curve. A squat curve is a measurement of the changing magnitude and direction of squat developed under powered acceleration as suspension system is cycled through suspension travel from its beginning uncompressed point to its ending fully compressed point. Every instantaneous point in a suspension travel has a corresponding instantaneous amount of squat present. These instantaneous squat points can be measured or graphed as a point on the squat layout line at a perpendicular distance from the lower squat layout line. When the desired instantaneous amounts of squat at instantaneous points in the suspension travel are known, squat definition points can be graphed in conjunction with each other, beginning when a suspension is in its uncompressed state and ending in its fully compressed state, and in relation to the vehicle geometry to obtain a suspension kinematical layout which will attain the desired squat curve. The squat curve beginning value is measured at the point where the suspension system is in its completely uncompressed state. As the suspension is cycled further through suspension travel towards complete compression pausing at a minimum of 5 percent total suspension travel increments, further squat points are measured and graphed versus their correlating escalating percent total suspension travel increments. Suspension travel displacement is measured in a direction parallel to and against gravity, and parallel to the instantaneous squat point measurements. Critical and known preexisting defining points such as vehicle wheelbase, powertrain location, and center of mass are graphed alongside the squat definition points to obtain a clear picture of vehicle squat performance. Vehicle graphs for obtaining and defining squat performance are always laid out with the vehicle viewed in the side elevational view.

A squat layout line is drawn parallel to and against gravitational force through center of the front wheel contact patch between the tire and the ground and terminating at further points. A squat definition point, which is taken directly from the aforementioned squat curve will be graphed on this squat layout line. A squat lower measurement definition line is drawn from the center of the driven wheel tire to ground contact patch perpendicular to and terminating on the squat layout line. Squat definition points are drawn on the squat definition line in relation to one another, and in relation to the squat lower measurement definition line. A squat definition point drawn above the squat lower measurement definition line will correlate with a squat amount. A squat definition point drawn coincident with the squat lower measurement definition line will correlate with a zero squat amount. A squat definition point drawn below the squat lower measurement definition line will correlate with a pro squat amount. A squat force vector is drawn from the center of the driven wheel tire to ground contact patch to the squat point on the squat layout line. As the suspension is moved through instantaneous measured points through suspension travel, the squat force vector is drawn with a beginning point at the center of the rear tire to ground contact patch, and an ending point at its corresponding measured instantaneous squat point graphed on the squat layout line.

Diversion in graphical method to obtain specific suspension system kinematical layouts from a desired squat curve must occur when factoring in specifics for different types of power transfer systems such as shaft drive or chain drive.

A shaft drive system generally uses a power transmission system that can transmit power via rotary motion from a power unit output shaft to a wheel shaft. The two shafts are generally fixed at close to a perpendicular angle in one plane. Power transmission systems can vary from gears to cogs to friction wheels and other types of systems, all herein referred to universally as cogs. These shaft drive systems feature a driving cog which is rotatably attached to the power unit output, a first intermediate cog, which transfers rotational motion from the driving cog to a relatively perpendicular shaft, a second intermediate cog, which transfers rotational motion from the shaft to a driven cog which is rotatably attached to the rotation axis of a wheel.

Shaft drive vehicle powertrains and suspensions typically take one of two forms. These are, a single pivot system, or a multi link system. A simple single pivot system features a driven cog that is fixed to and housed within a swinging wheel carrier link which pivots around a single pivot. In this arrangement, there is only one pivot connecting the swinging wheel carrier link to the vehicle frame structure. The rotating drive torque is acted against by the driven cog housing, which is part of the swinging wheel carrier link. Action against the drive torque in the swinging wheel carrier link causes a torque about the ling single frame pivot. The addition of this torque plus the driving force imparted through the wheel tire combination to the ground through a tire to ground contact patch totals a squat response. An instantaneous pivot location for a single pivot shaft drive system can be found at any point on a drawn squat force vector that correlates with the desired instantaneous squat response. These single pivot systems produce a linear squat curve.

A multi pivot linkage can be used to alter squat characteristics and obtain a variable squat curve in a shaft driven wheel suspension system. A multi link shaft drive suspension system isolates the torque passed through the driven cog in the system from the swinging link system. In a 4-bar variation, the driven cog is attached to a swinging wheel carrier link, which pivots at one end of a first swinging link. The first carrier manipulation link is pivotally attached to the vehicle chassis at the end opposite of the swinging wheel carrier link pivot. A torque reaction, like the one discussed in the single pivot shaft drive system works to rotate the swinging wheel carrier link against the first carrier manipulation link. A second carrier manipulation link is also attached to the swinging wheel carrier link. This second carrier manipulation link is attached to the vehicle chassis at a different location from the first swinging carrier manipulation link. The second carrier manipulation link works to inhibit free rotation of the swinging wheel carrier link against the first carrier manipulation link. To find instantaneous carrier manipulation link pivot points which will give a desired instantaneous squat amount, its correlating desired squat force vector must be graphed. The two swinging wheel carrier link pivots are next defined. Carrier manipulation link force lines are drawn so that a force line passes directly through the center of the rearward pivots which are coincident with the pivots on the swinging wheel carrier link. The carrier manipulation link force lines are drawn so that they intersect on the desired squat force vector. The first and second vehicle chassis pivots can be positioned upon the corresponding first and second carrier manipulation link force lines to attain the desired instantaneous squat response. Graphing the carrier manipulation link force lines and desired squat force vectors together overlaid at multiple points in the suspension travel will allow the designer to choose pivot point locations and kinematical suspension layout that can attain a desired variable squat curve.

A chain drive powertrain system uses a chain or belt to transmit power between two reasonably parallel shafts. Chain drive systems are very common in motorcycle, ATV, and bicycle applications because of their light weight, robustness, and simplicity in both manufacturing and use. The chain drive systems feature a driving cog and a driven cog, with the driving cog attached to a power source, and a driven cog rotatably attached to the rotation axis of a wheel. The driven wheel or wheels is/are attached to a swinging link or linkage system via a bearing or bushing system, which allows rotational motion of the driven wheel or wheels in relation to the swinging link or linkage system.

Chain drive suspensions typically take one of several forms. These include single pivot systems, multi link systems, cam/track type systems, and flexure type systems. The suspensions can also feature variable chainline type designs, which manipulate a chain force vector line through the use of a pulley system that moves with the suspension. A single pivot system uses a single pivoting suspension link to transmit force between a suspended wheel and a chassis. A multi link system uses an arrangement of pivoting suspension links to transmit force between a suspended wheel and a chassis. A cam/track type system that uses sliding elements but does not use links to attain force transfer from a wheel axle to a chassis is also possible but uncommon in practice. Flexure type systems use flexing elements to transmit power from a suspended wheel to a chassis structure. In all types of the chain driven wheel suspension system mentioned above, the driving force can be represented as a vector drawn perpendicular to the driven wheel axle path. In a chain driven suspension, driving force is always the major force component when compared to chain pull.

There are two internal forces present within a chain driven vehicle chassis that together create a squat response. These two forces are driving force, and chain pull force.

When a chain driven vehicle is accelerated, force is transferred from a power source to a driving cog. This driving cog transmits its force through a chain to a driven cog. The force direction and magnitude present in the tensioned chain are referred to as chain pull force. Fixed chainline type designs are present where at any instantaneous point, a single driving cog is fixed rotationally on a chassis structure, and a driven cog is attached to a suspension member, and force is transmitted from the driving cog to the driven cog through a chain. In this fixed chainline type design, the chainline force vector is always located at one end by the tensioned chainline tangent point where the chain is fixed in relation to the vehicle chassis structure, and by the tensioned chainline tangent point of the moving pulley at the opposite end.

In variable chainline type designs, which manipulate a chain force vector line through the use of a pulley system that moves with the suspension, the chainline force vector is always located at one end by the tensioned chainline tangent point where the chain is fixed in relation to the vehicle chassis structure, and by the tensioned chainline tangent point of the moving pulley at the opposite end. Sliding elements can also be substituted for pulleys in this application.

In the chain drive powertrain, the driven cog is rotatably attached to a wheel/tire combination. The wheel pushes against the ground resulting in friction. As the wheel rotates a driving force transmitted from the contact patch through the wheel structure and a force is imparted at the rear hub axle. This pushing force can be transferred to the chassis via a wheel suspension system, ultimately pushes the vehicle forward. This pushing force is referred to as driving force. The driving force direction is measured and represented graphically as a driving force vector drawn from the driven wheel rotation axis, perpendicular to the driven axle path, where the axle path is defined as a line that a suspended wheel rotational axis travels as a suspension is moved through suspension travel. This axle path can be a constant curvature or changing curvature line depending on suspension layout.

A simple single pivot system features a driven cog that is rotatably attached to a wheel, which is rotatably attached to a swinging wheel carrier link which pivots around a singular pivot. In this arrangement, the suspended wheel travels in a constant radius arc. To find the instantaneous swinging link pivot point for a single pivot chain drive system, which will give a desired instantaneous squat amount, its correlating desired squat force vector must be graphed. Because there is only one link in the single pivot suspension, the swinging link pivot will lie coincident with the driving force line. Desired vehicle geometry is graphed in a side view. This vehicle geometry will include the size, location, and center points of vehicle tires, powertrain component layout, and the direction of gravitational force. A squat layout line is graphed first. A desired squat force vector is drawn from the center of a rear wheel contact patch to the desired squat layout point on a squat layout line as described previously.

Next, the chain force vector is graphed in relation to the powertrain components as described previously. The chain force vector is drawn so that it intersects the squat force vector. Finally, the driving force vector is drawn from the center of the rear wheel axis to the intersection point of the squat force vector and chain pull force vector. The pivot point for the single pivot swinging link suspension arm will lie at any point along the driving force vector to achieve the desired instantaneous squat amount. Graphing the chain pull force vector, and squat force vectors together overlaid at multiple points in the suspension travel will allow the designer to find driving force vectors at multiple points through the suspension travel. The crossing point of the overlaid driving force vectors for different points in the suspension travel define the single pivot point location and kinematical suspension layout that can attain the desired squat curve.

Multi link systems, cam/track (sliding link) type systems, and flexure type systems feature a driven cog that is rotatably attached to a wheel, which is rotatably attached to a swinging wheel carrier link which moves the wheel along an axle path that is defined by a multi element system. To aid the analysis of multi-element systems, it is simplest to define or measure an axle path which will guide a wheel, and then define the elements that will give the desired axle path later, as opposed to trying to define elements first and measure axle path as a byproduct later to attain a desired result. Multi element systems do not have a single hardware defined pivot point like a single fixed pivot system does. The multi element systems use combinations of links or cams to project a virtual or instantaneous pivot point. This pivot point can always be found at a point along a driving force vector, which is drawn perpendicular to a driven wheel axle path as previously described.

To find the axle path which will give a desired instantaneous squat amount, its correlating desired squat force vectors must be graphed. Desired vehicle geometry is graphed in a side view. This vehicle geometry will include the size, location, and center points of vehicle tires, vehicle ground plane, powertrain component layout, and the direction of gravitational force. A vehicle wheel suspension system always has a minimum suspension travel point, where the suspended wheel is at its zero compressed suspension travel point, and a maximum suspension travel point, where the suspended wheel is at its 100 percent compressed suspension travel point. Several overlaid graphs must be made to obtain a squat curve. The minimum increment in suspension compression displacement that can be used to graph an accurate squat curve from the graphical method using squat force vectors as presented has been found to be 5 percent of total suspension compression displacement between graphed squat force vectors. A squat layout line is graphed first. A desired squat force vector is drawn from the center of a driven wheel contact patch to the desired squat layout point on a squat layout line as described previously. Next, the chain force vector is graphed in relation to the powertrain components as described previously. The chain force vector is drawn so that it intersects the squat force vector. Finally, the driving force vector is drawn from the center of the driven wheel axis to the intersection point of the squat force vector and chain pull force vector. The instantaneous pivot point for the single pivot swinging link suspension arm will lie at any point along the driving force vector to achieve the desired instantaneous squat amount. Graphing the chain pull force vector, and squat force vectors together overlaid at multiple points in the suspension travel will allow the designer to find driving force vectors at multiple points through the suspension travel. The crossing point of the overlaid driving force vectors for different points in the suspension travel define the instantaneous pivot point movement through the suspension travel, and kinematical suspension layout that can attain the desired squat curve. For multi element systems, there are several methods that can define element layout based on a desired axle path, for example, by using kinematical analysis computer software. Software that can perform this specific function is marketed under the names SyMech, which is available from SyMech Inc, 600 Townsend Street, San Francisco, Calif., 94107, USA, and SAM, which is available from ARTAS—Engineering Software, Het Puyven 162, NL-5672 RJ Nuenen, The Netherlands. This software allows a user to define an axle path, and set parameters such as mechanical element type, number of mechanical elements, and desired location of anchor components. The software will then suggest multiple link layout choices that will meet all of the set forth parameters. Graphical analysis can also be performed by hand. In a hand graphical analysis, the mechanical components of a multi element system are measured at multiple points through the suspension travel. At each point in the suspension travel, the instant center of the link system is graphed. A common 4-bar linkage suspension system features a driven cog that is rotatably attached to a driven wheel, which is rotatably attached to a swinging wheel carrier link which is pivotably attached to two separate carrier manipulation links. The swinging links are pivotably attached to a vehicle chassis at their other ends. The instant center in a 4 bar pivoting linkage system such as shown in FIG. 1a, is found by projecting individual link force lines through both pivots of each of the two carrier manipulation links that support the swinging wheel carrier. The two carrier manipulation link force lines are projected so that they intersect each other. This intersection point is commonly known at the instant force center. A driving force line can be drawn directly from the rotation axis of the driven wheel to this instant force center. As the carrier manipulation links rotate on their pivots, the instant center position changes in relation to the driven wheel rotation axis and the vehicle chassis. This causes the driving force line to move in relation to the chain force line. Because the squat force line is defined in part by the location of the driven wheel contact patch, and the intersection between the driving force vector and the chain force vector, a change in squat vector direction can occur. The perpendicular distance from the lower squat definition line to the point at which this squat direction vector intersects the drawn squat layout line to is measured and recorded.

Four bar sliding link suspension systems are analyzed identically to 4 bar pivoting systems, but the identification of the instant center is performed in a slightly different manner due to the constraints of the sliding link system. Four bar sliding link systems feature a driven cog that is rotatably attached to a driven wheel, which is rotatably attached to a swinging wheel carrier link which is pivotably attached to two separate sliding carrier manipulation sliding blocks. The individual carrier manipulation sliding blocks move on individual sliding rails. The instant center in a 4 bar sliding linkage system is found by projecting individual sliding link force lines centered at the pivots of each of the two carrier manipulation sliding block that support the swinging wheel carrier. The carrier manipulation sliding block force lines are projected perpendicular to the sliding rail so that the two carrier manipulation sliding black force lines intersect each other. This intersection can be referred to as the instant force center. A driving force line can be drawn directly from the rotation axis of the driven wheel to this instant force center. As the carrier manipulation sliding blocks slide on their respective sliding rails, the instant center position changes in relation to the driven wheel rotation axis and the vehicle chassis. This causes the driving force line to move in relation to the chain force line. Because the squat force line is defined in part by the location of the driven wheel contact patch, and the intersection between the driving force vector and the chain force vector, a change in squat vector direction can occur. The perpendicular distance from the the lower squat definition line to the point at which this squat direction vector intersects the drawn squat layout line to is measured and recorded.

Measurement of multi element systems to determine axle path can be done graphically, or by using measurement equipment. Using measurement equipment, the vehicle can be rigidly mounted and oriented so that the suspended wheel can be moved freely through measured points in its suspension travel while the chassis stays stationary. In a side view orientation, the horizontal and vertical distance from the suspended wheel rotation axis to a fixed point on the vehicle frame at multiple points in the suspension travel is taken. As the suspension is cycled through suspension travel, the corresponding measurements of horizontal and vertical distance form a wheel rotation axis travel path in relation to the vehicle chassis. This path is referred to as the axle path.

Analysis has shown that a vehicle with a compressible suspension system using a chain driven suspended wheel achieves the squat curve 17 of the current invention by having a layout that features a driven cog that is rotatably attached to a driven wheel, which is rotatably attached to a swinging wheel carrier link which is pivotably attached to separate upper and lower carrier manipulation links. The upper and lower carrier manipulation links are pivotably attached to a vehicle chassis at their other ends. The upper and lower carrier manipulation links rotate in the same rotational direction about their respective fixed axis at the vehicle chassis. The upper carrier manipulation link is arranged in relation to the lower carrier manipulation link so that the instant center projected by the two carrier manipulation links, when measured at zero percent suspension compression, is at a point that is beyond the outer limits of the two pivots of the lower carrier manipulation link. This condition is shown in FIGS. 1a and 1c. As the suspension is compressed towards a point of full compression, the rotation of the upper and lower carrier manipulation links in relation to each other causes the instant center of the linkage system to lie at points on the lower carrier manipulation link in between the lower carrier manipulation link fixed vehicle chassis pivot, and moving pivot attached to the swinging wheel carrier link. This condition is shown in FIGS. 1b and 1d.

Analysis has shown that a vehicle with a compressible suspension system using a shaft driven suspended wheel achieves the squat curve 17 of the current invention by having a layout that features a driven cog that is rotatably attached to a driven wheel, which is rotatably attached to a swinging wheel carrier link which is pivotably attached to separate upper and lower carrier manipulation links. The upper and lower carrier manipulation links are pivotably attached to a vehicle chassis at their other ends. The upper and lower carrier manipulation links rotate in a contra rotational direction about their fixed axes at the vehicle chassis. The upper carrier manipulation link is arranged in relation to the lower carrier manipulation link so that the instant center projected by the two carrier manipulation links, when measured at zero percent suspension compression, lies at a point on the lower carrier manipulation link in between the lower carrier manipulation link fixed vehicle chassis pivot, and moving pivot attached to the swinging wheel carrier link. This condition is shown in FIGS. 2a and 2c. As the suspension is compressed towards a point of full compression, the rotation of the upper and lower carrier manipulation links in relation to each other causes the instant center of the linkage system to lie at a point that is beyond the outer limits of the two pivots of the lower carrier manipulation link. This condition is shown in FIGS. 2a and 2d.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. All cited publications, patents, and patent applications are herein incorporated by reference in their entirety.

What is claimed is:

1. A driven wheel suspension comprising a driven wheel, a damper unit, an upper carrier manipulation link and a lower carrier manipulation link, wherein said upper carrier manipulation link and said lower carrier manipulation link are arranged so that force lines through pivots of each of said manipulation links intersect in an instant center, and wherein said instant center is positioned beyond outer limits of two pivots of the lower carrier manipulation link at zero percent suspension compression and in between said two pivots as the suspension is compressed towards a point of full compression.

2. The suspension system of claim 1, wherein the suspension system is useful for a chain driven vehicle.

3. The suspension system of claim 1, wherein the suspension system is useful for a belt driven vehicle.

4. The suspension system of claim 1, wherein the suspension system is useful for a human powered vehicle.

5. The suspension system of claim 1 wherein a damper unit is connected to the upper carrier manipulation link.

6. The suspension system of claim 1 wherein a damper unit is connected to the lower carrier manipulation link.

7. The suspension system of claim 1 wherein a damper unit is connected to a wheel carrier link.

8. The suspension system of claim 1 wherein a damper unit is connected to the upper carrier link and lower carrier manipulation link.

9. The suspension system of claim 1, wherein the damper unit is selected from the group consisting of a spring, a compression gas spring, a leaf spring, a coil spring, and a fluid.

* * * * *

(12) EX PARTE REEXAMINATION CERTIFICATE (6481st)
United States Patent
Weagle

(10) Number: US 7,128,329 C1
(45) Certificate Issued: Oct. 14, 2008

(54) VEHICLE SUSPENSION SYSTEMS

(75) Inventor: David Weagle, Edgartown, MA (US)

(73) Assignee: DW-Link Incorporated, Edgartown, MA (US)

Reexamination Request:
No. 90/008,792, Jul. 27, 2007

Reexamination Certificate for:
Patent No.: 7,128,329
Issued: Oct. 31, 2006
Appl. No.: 10/949,264
Filed: Sep. 24, 2004

Related U.S. Application Data

(63) Continuation-in-part of application No. 10/669,412, filed on Sep. 25, 2003, now Pat. No. 7,048,292.

(51) Int. Cl.
*B62K 25/00* (2006.01)

(52) U.S. Cl. ...................................................... 280/284
(58) Field of Classification Search ................. None
See application file for complete search history.

(56) References Cited

U.S. PATENT DOCUMENTS

| 4,909,529 A | 3/1990 | Maguire |
| 5,441,292 A | 8/1995 | Busby |
| 6,378,885 B1 | 4/2002 | Ellsworth et al. |
| 6,969,081 B2 | 11/2005 | Whyte |
| 2003/0038450 A1 | 2/2003 | Lam |

FOREIGN PATENT DOCUMENTS

WO    WO 03/037701 A1    5/2003

*Primary Examiner*—Joseph A. Kaufman

(57) ABSTRACT

A wheel suspension system having under powered acceleration a squat response that begins in the realm of anti squat and passes through a point of lessened anti squat at a further point in the travel.

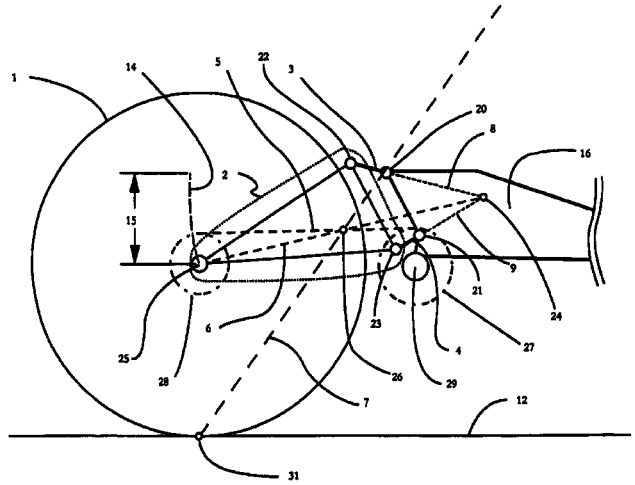

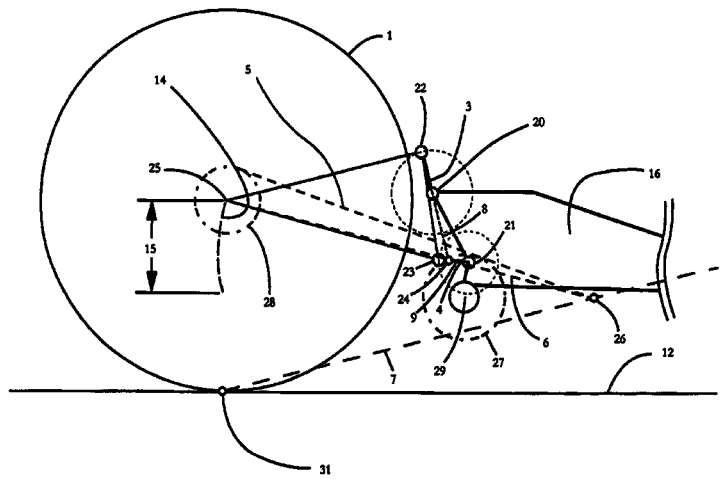

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–9, dependent on an amended claim, are determined to be patentable.

1. A driven wheel suspension comprising a driven wheel, a damper unit, an upper carrier manipulation link and a lower carrier manipulation link, wherein said upper carrier manipulation link and said lower carrier manipulation link are arranged so that force lines through pivots of each of said manipulation links intersect in an instant center, and wherein said instant center is positioned beyond outer limits of two pivots of the lower carrier manipulation link at zero percent suspension compression and in between said two pivots as the suspension is *fully* compressed [towards a point of full compression].

\* \* \* \* \*